United States Patent
Nakada et al.

(10) Patent No.: US 12,423,934 B2
(45) Date of Patent: Sep. 23, 2025

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Yuichi Nakada, Kanagawa (JP); Tomokazu Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 239 days.

(21) Appl. No.: 18/366,980

(22) Filed: Aug. 8, 2023

(65) Prior Publication Data

US 2024/0054747 A1  Feb. 15, 2024

(30) Foreign Application Priority Data

Aug. 15, 2022  (JP) .................................. 2022-129247

(51) Int. Cl.
  *G06T 19/20* (2011.01)
  *G06T 7/50* (2017.01)
  *G06T 7/70* (2017.01)

(52) U.S. Cl.
  CPC ................ *G06T 19/20* (2013.01); *G06T 7/50* (2017.01); *G06T 7/70* (2017.01); *G06T 2219/2021* (2013.01)

(58) Field of Classification Search
  None
  See application file for complete search history.

(56) References Cited

U.S. PATENT DOCUMENTS

| | | | |
|---|---|---|---|
| 9,055,218 B2 | 6/2015 | Nishiyama | |
| 9,438,792 B2 | 9/2016 | Nakada | |
| 11,030,799 B2 | 6/2021 | Nakada | |
| 2002/0164066 A1* | 11/2002 | Matsumoto | G06T 17/10 382/154 |

(Continued)

FOREIGN PATENT DOCUMENTS

JP  2008-015863 A  1/2008

OTHER PUBLICATIONS

Hemmat et al. "Exploring distance-aware weighting strategies for accurate reconstruction of voxel-based 3D synthetic models." MultiMedia Modeling: 20th Anniversary International Conference, MMM 2014, Dublin, Ireland, Jan. 6-10, 2014, Proceedings, Part I 20. Springer International Publishing, 2014. (Year: 2014).*

(Continued)

*Primary Examiner* — Daniel F Hajnik
*Assistant Examiner* — Jed-Justin Imperial
(74) *Attorney, Agent, or Firm* — Venable LLP

(57) ABSTRACT

An object is to obtain three-dimensional shape data with high accuracy from three-dimensional shape data representing an approximate shape of an object. Three-dimensional shape data of an object existing in an image capturing space is obtained. Further, a plurality of distance images each representing a distance to the object and corresponding to a plurality of viewpoints is obtained. Then, correction to evaluate the three-dimensional shape data based on the plurality of distance images and based on results of the evaluation, delete a unit element estimated not to represent a shape of the object among unit elements configuring the three-dimensional shape data is performed.

24 Claims, 33 Drawing Sheets

(56) References Cited

U.S. PATENT DOCUMENTS

2009/0154794 A1* 6/2009 Kim .................. G06T 17/20
                  382/154

OTHER PUBLICATIONS

Ismael Muhammad, et al., "Actor 3D reconstruction by a scene-based, visual hull guided, multi-stereovision framework," Computer Science Research Notes, CSRN 2802, WSCG 2018, Short Papers Proceedings, May 28, 2018-Jun. 1, 2018 (Jan. 1, 2018), XP093112167, ISSN: 2464-4617, DOI: 10.24132/CSRN.2018.2802.7, ISBN: 978-80-86-94341-1, retrieved from the Internet: URL:http://wscg.zcu.cz/WSCG2018/2018-papers/!!_CSRN-2802-7.pdf, pp. 46-55.

Jan. 19, 2024 European Official Action in European Patent Appln. No. 23191255.1.

Rafael Pagés, "Refined facial disparity maps for automatic creation of 3D avatars," Three Dimensional Image Processing (3DIP) and Applications II, Proceedings of SPIE-IS&T Electronic Imaging, vol. 8290, Feb. 9, 2012, XP093160261, retrieved from https://dx.doi.org/10.1117/12.908259, pp. 82900J-1-82900J-8.

May 23, 2024 European Official Action in European Patent Appln. No. 23191255.1.

\* cited by examiner

 THRESHOLD VALUE= 2
 THRESHOLD VALUE= 1
 THRESHOLD VALUE= 2
 THRESHOLD VALUE= 1
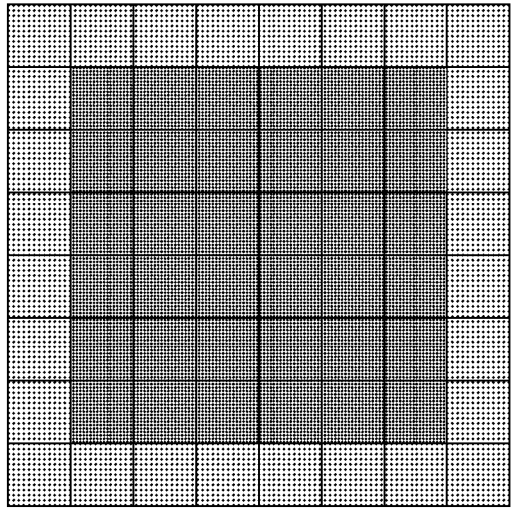
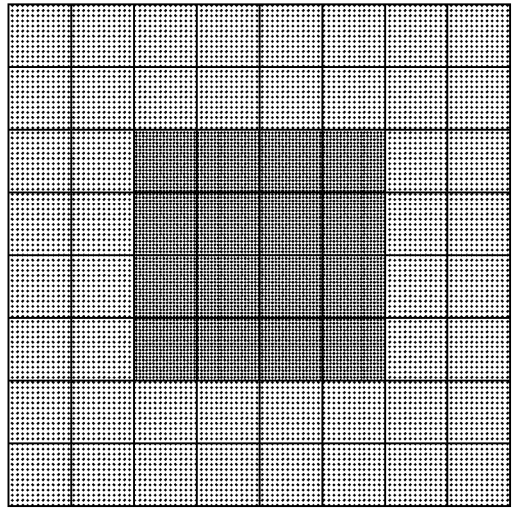
FIG.14A  FIG.14B
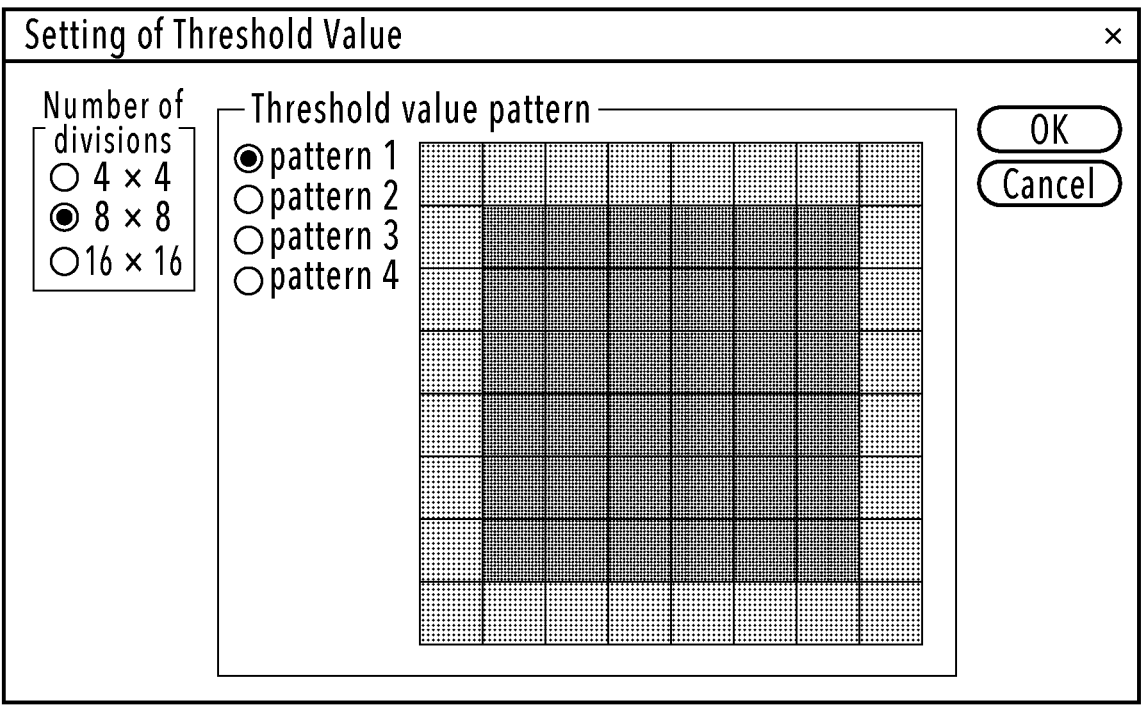
FIG.14C

FIRST DIRECTION

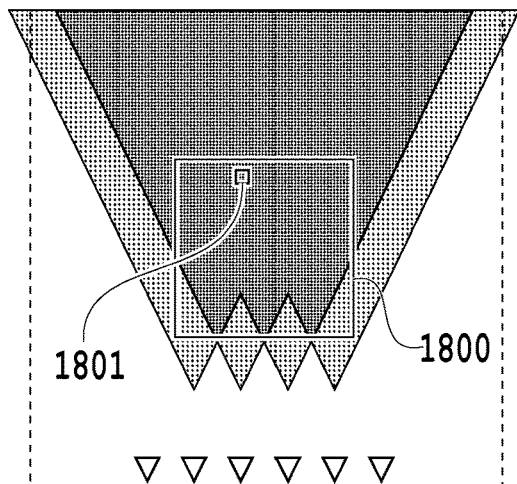

- TEMPORARY THRESHOLD VALUE = 2 : NUMBER OF VISIBLE DISTANCE IMAGES ≥ 3
- TEMPORARY THRESHOLD VALUE = 1 : NUMBER OF VISIBLE DISTANCE IMAGES = 2

FIG.18A

SECOND DIRECTION

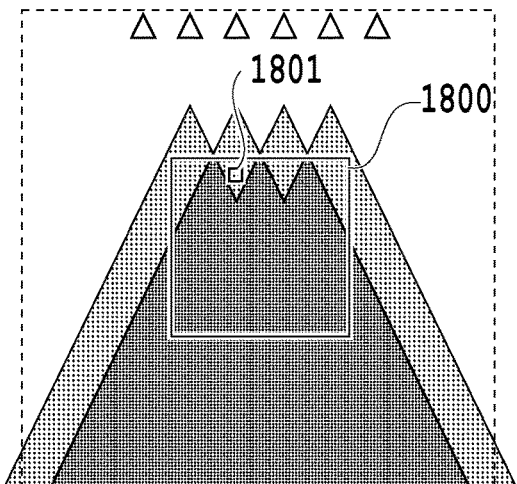

- TEMPORARY THRESHOLD VALUE = 2 : NUMBER OF VISIBLE DISTANCE IMAGES ≥ 3
- TEMPORARY THRESHOLD VALUE = 1 : NUMBER OF VISIBLE DISTANCE IMAGES = 2

FIG.18B

THIRD DIRECTION

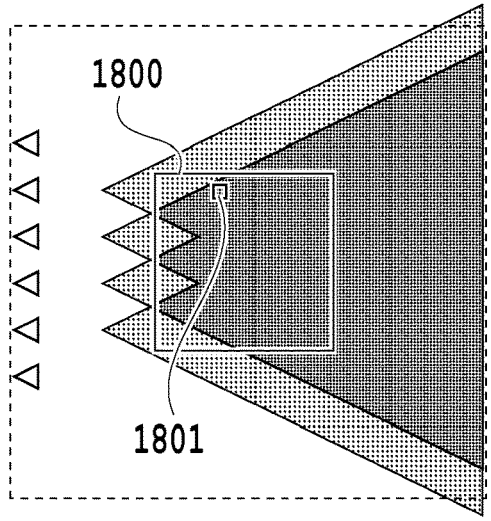

- TEMPORARY THRESHOLD VALUE= 2 : NUMBER OF VISIBLE DISTANCE IMAGES ≥ 3
- TEMPORARY THRESHOLD VALUE= 1 : NUMBER OF VISIBLE DISTANCE IMAGES = 2

FIG.18C

FOURTH DIRECTION

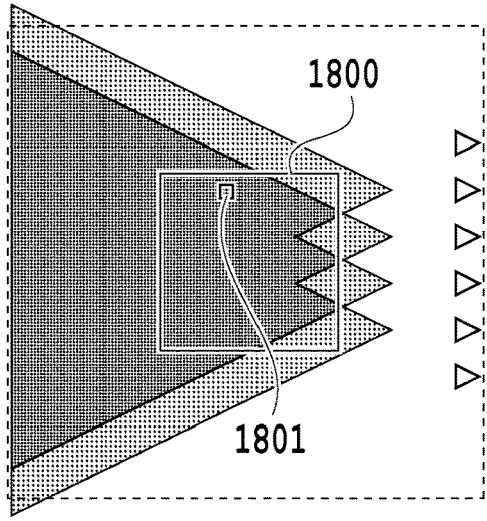

- TEMPORARY THRESHOLD VALUE= 2 : NUMBER OF VISIBLE DISTANCE IMAGES ≥ 3
- TEMPORARY THRESHOLD VALUE= 1 : NUMBER OF VISIBLE DISTANCE IMAGE = 2

FIG.18D

IMAGE PROCESSING APPARATUS, IMAGE PROCESSING METHOD, AND STORAGE MEDIUM

FIELD

The present disclosure relates to an image processing technique to generate three-dimensional shape data of an object.

DESCRIPTION OF THE RELATED ART

As a method of generating three-dimensional shape data (generally, also called "3D model") of an object based on a plurality of captured images obtained by capturing the object from different viewpoints, the visual hull method is known. With the visual hull method, it is possible to obtain three-dimensional shape data of an object stably and fast, but there is a drawback that an error is likely to occur. Specifically, there is such a principal problem that in a case where the surface of an object has the shape of a curved or concave surface, the shape is approximated by a flat surface, and therefore, an error becomes large. For this problem, Japanese Patent Laid-Open No. 2008-015863 has disclosed a technique to restore accurate three-dimensional shape of an object by procedures 1) to 4) shown below.

1) Based on a silhouette image of an object generated from a captured image, a 3D model (approximate shape model) circumscribing the object is generated by the visual hull method.

2) Based on the approximate shape model, information on an approximate distance from the image capturing camera to the surface of the approximate shape model and information on a local shape of the object are generated.

3) By taking the approximate distance information as an initial value, a search is performed by using a function storing the local shape information and information on a distance from the image capturing camera to the object is generated.

4) Based on the distance information generated in 3) described above and the silhouette image, the three-dimensional shape of the object is restored.

Even with the technique of Japanese Patent Laid-Open No. 2008-015863 described above, for example, for a concave portion, there is a case where the difference between the local shape obtained based on the approximate shape model and the local shape of the original object is not made up and an error occurs in the distance information, and therefore, sufficiently accurate three-dimensional shape data is not obtained.

SUMMARY

An object of the present disclosure is to obtain three-dimensional shape data with high accuracy from three-dimensional shape data representing an approximate shape of an object.

The image processing apparatus according to the present disclosure has: one or more memories storing instructions; and one or more processors executing the instructions to: obtain three-dimensional shape data of an object existing in an image capturing space; obtain a plurality of distance images each representing a distance to the object and corresponding to a plurality of viewpoints; and correct the three-dimensional shape data by evaluating the three-dimensional shape data based on the plurality of distance images and based on results of the evaluation, deleting a unit element estimated not to represent a shape of the object among unit elements configuring the three-dimensional shape data.

Further features of the present disclosure will become apparent from the following description of exemplary embodiments with reference to the attached drawings.

BRIEF DESCRIPTION OF THE DRAWINGS

FIG. 14A and FIG. 14B are each a diagram showing one example of a threshold value pattern and FIG. 14C is a diagram showing one example of a user interface screen for designating the number of divisions and a threshold value pattern;

FIG. 18A to FIG. 18D are each a diagram showing one example of temporary threshold values for each group;

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

In the present embodiment, surface three-dimensional information on an object is obtained from each captured image used for generation of three-dimensional shape data representing an approximate shape of the object and based on the surface three-dimensional information, a distance image representing a distance from each camera to the object is corrected. Then, based on the corrected distance image, the three-dimensional shape data representing the approximate shape is corrected and three-dimensional shape data with high accuracy is obtained.

<System Configuration>

Figure 1:
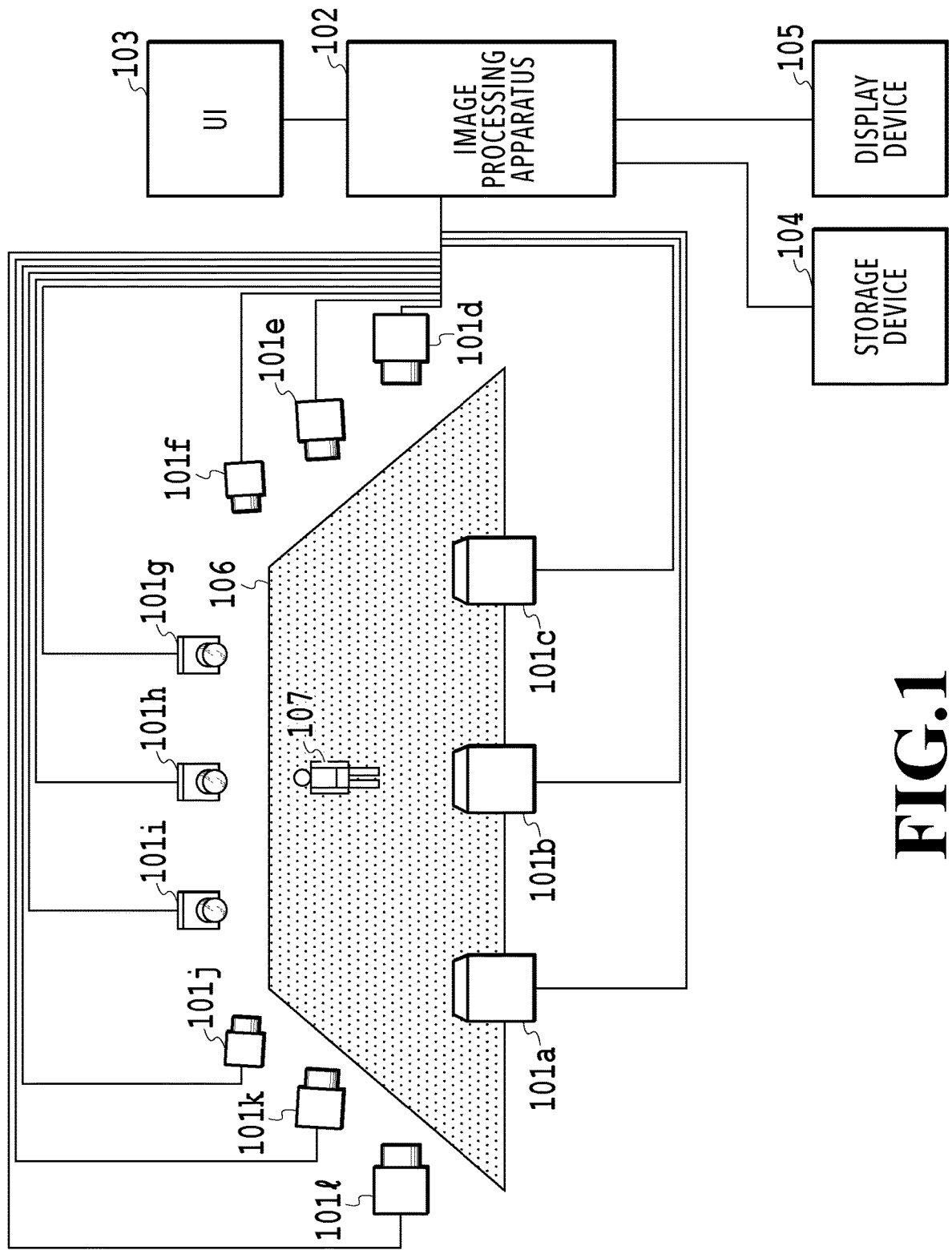
FIG. 1 is a diagram showing a configuration example of an image processing system.

FIG. 1 is a diagram showing a configuration example of an image processing system according to the present embodiment. The image processing system in the present embodiment has 12 cameras 101a to 101l, an image processing apparatus 102, a user interface (UI) 103, a storage device 104, and a display device 105. There is a case where the 12 cameras 101a to 101l are described together simply as "camera 101". Each of the cameras 101a to 101l, which is an imaging device, obtains a captured image by performing synchronous image capturing from an individual viewpoint different from one another for an object 107 existing in an image capturing space 106 in accordance with image capturing conditions. There is a case where a plurality of captured images thus obtained, whose viewpoints are different, is called together "multi-viewpoint image". In the present embodiment, as the multi-viewpoint image, a moving image including a plurality of frames is supposed, but the multi-viewpoint image may be a still image. The image processing apparatus 102 generates three-dimensional shape data representing an approximate shape (in the following, called "approximate shape data") of the object 107 based on the control of the camera 11 and a plurality of captured images obtained from the camera 101. The UI 103 is a user interface for a user to set image capturing conditions and perform various settings and includes a display and the like having a touch panel function. It may also be possible for the UI 103 to separately comprise a hard button and the like or further have a mouse and a keyboard as an input device. The storage device 104 is a large-capacity storage device receiving and storing approximate shape data generated in the image processing apparatus 102. The display device 105 is, for example, a liquid crystal display and receives and displays approximate shape data generated in the image processing apparatus 102 or corrected three-dimensional shape data with high accuracy. The image capturing space 106 is shown two-dimensionally in FIG. 1 for convenience, but in fact, is a rectangular parallelepiped space surrounded by the 12 cameras 101a to 101l and the rectangular area indicated by a solid line in FIG. 1 represents a contour in the longitudinal direction and in the transverse direction of the floor surface.

<Hardware Configuration of Image Processing Apparatus>

Figure 2:
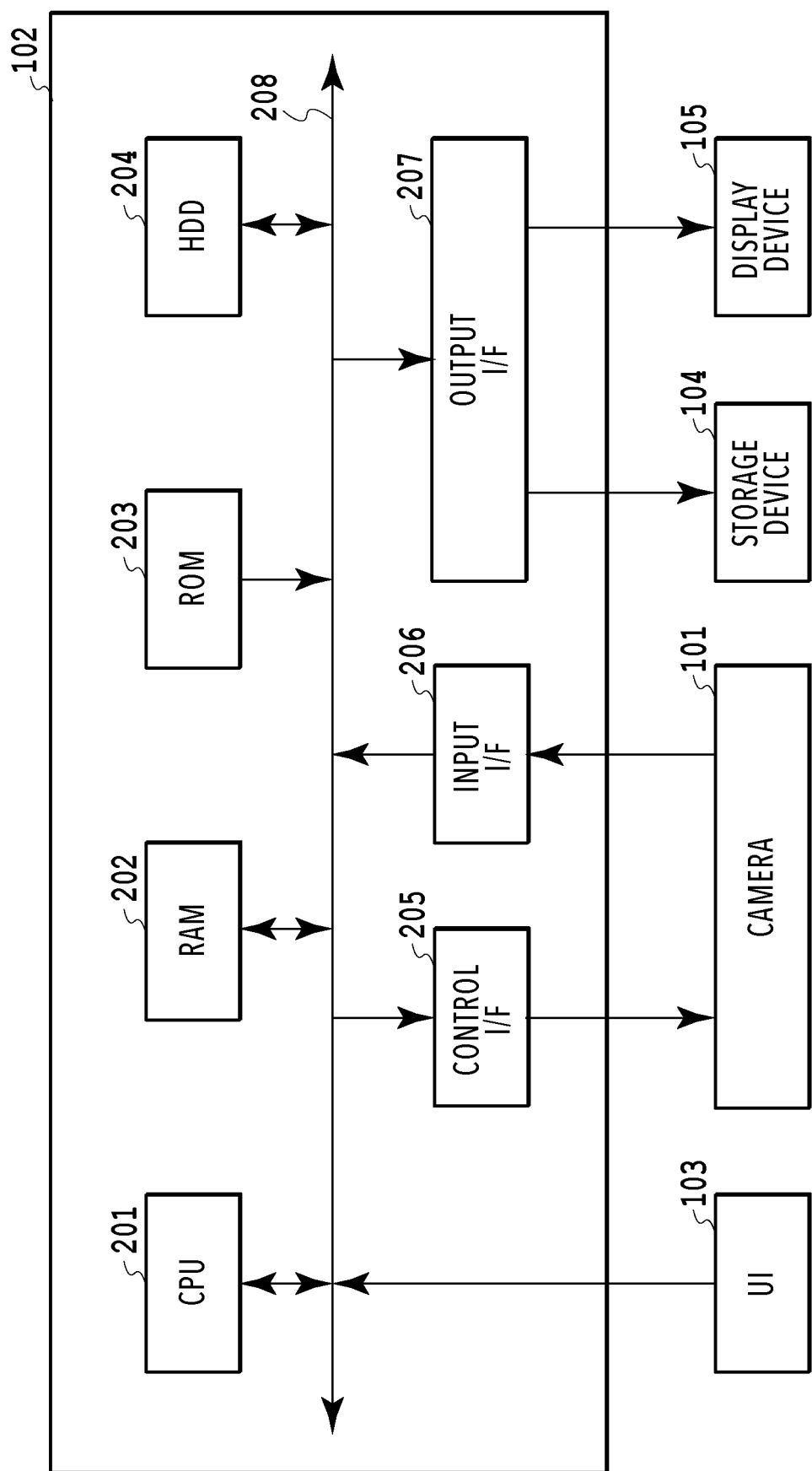
FIG. 2 is a diagram showing a hardware configuration example of an image processing apparatus.

FIG. 2 is a diagram showing a hardware configuration example of the image processing apparatus 102. The image processing apparatus 102 has a CPU 201, a RAM 202, a ROM 203, an HDD 204, a control interface (I/F) 205, an input interface (I/F) 206, an output interface (I/F) 207, and a main bus 208. The CPU 201 is a processor that comprehensively controls each unit of the image processing apparatus 102. The RAM 202 functions as a main memory, a work area and the like of the CPU 201. The ROM 203 stores a program group that is executed by the CPU 201. The HDD 204 stores applications that are executed by the CPU 201, data that is used in image processing, and the like. The control (I/F) 205 is connected with each of the cameras 101a to 101l and is an interface for performing setting of image capturing conditions and control, such as initiation of image capturing and termination of image capturing. The input I/F 206 is a serial bus interface, such as SDI and HDMI (registered trademark). Via this input I/F 206, a multi-viewpoint image obtained by each of the cameras 101a to 101l performing synchronous image capturing is obtained. The output I/F 207 is a serial bus interface, such as USB and IEEE 1394. The generated three-dimensional shape data is output to the storage device 104 and the display device 105 via this output I/F 207. The main bus 208 is a transmission path that connects each module within the image processing apparatus 102.

In the present embodiment, by using the 12 cameras 101 of the same specifications, one object is captured from each of four directions, that is, from front, back, left, and right, by the three cameras (101a to 101c, 101d to 101f, 110g to 101i, 101j to 101l) for each direction. It is assumed that the three cameras 101 that perform image capturing from the same direction are arranged on a straight line perpendicular to the light axis so that their light axes are parallel to one another. Further, it is assumed that camera parameters (internal parameters, external parameters, distortion parameters and the like) of each camera 101 are stored in the HDD 204. Here, the internal parameters represent the coordinates of the image center and the lens focal length and the external parameters represent the position and orientation of the camera. In the present embodiment, the 12 cameras of the same specifications are used, but the camera configuration is not limited to this. For example, it may also be possible to increase or decrease the number of cameras or change the distance to the image capturing space and the lens focal length in accordance with the direction in which image capturing is performed.

<Function Configuration of Image Processing Apparatus>

Figure 3:
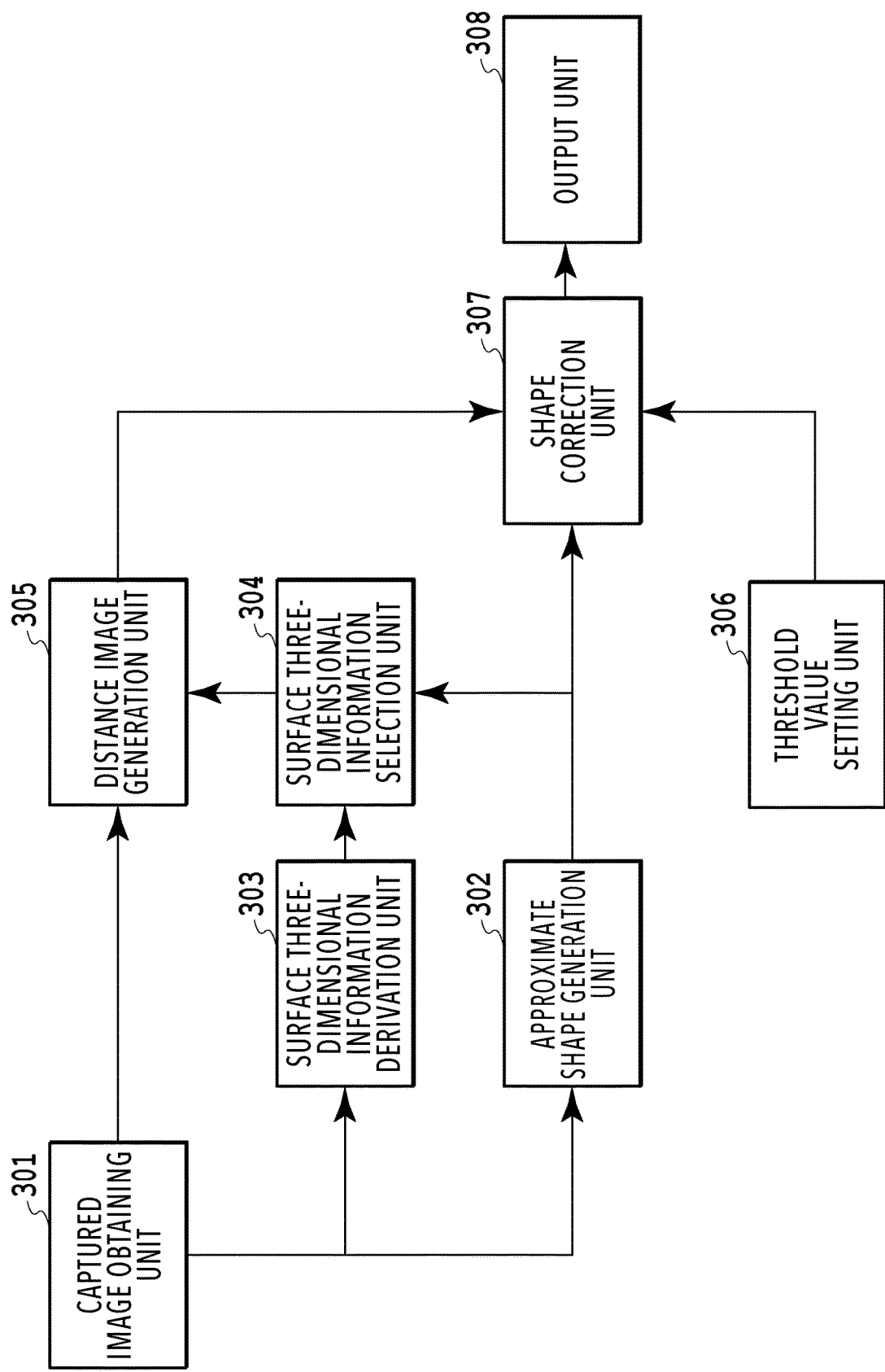
FIG. 3 is a diagram showing a function configuration (software configuration) example of an image processing apparatus according to a first embodiment.
Figure 4:
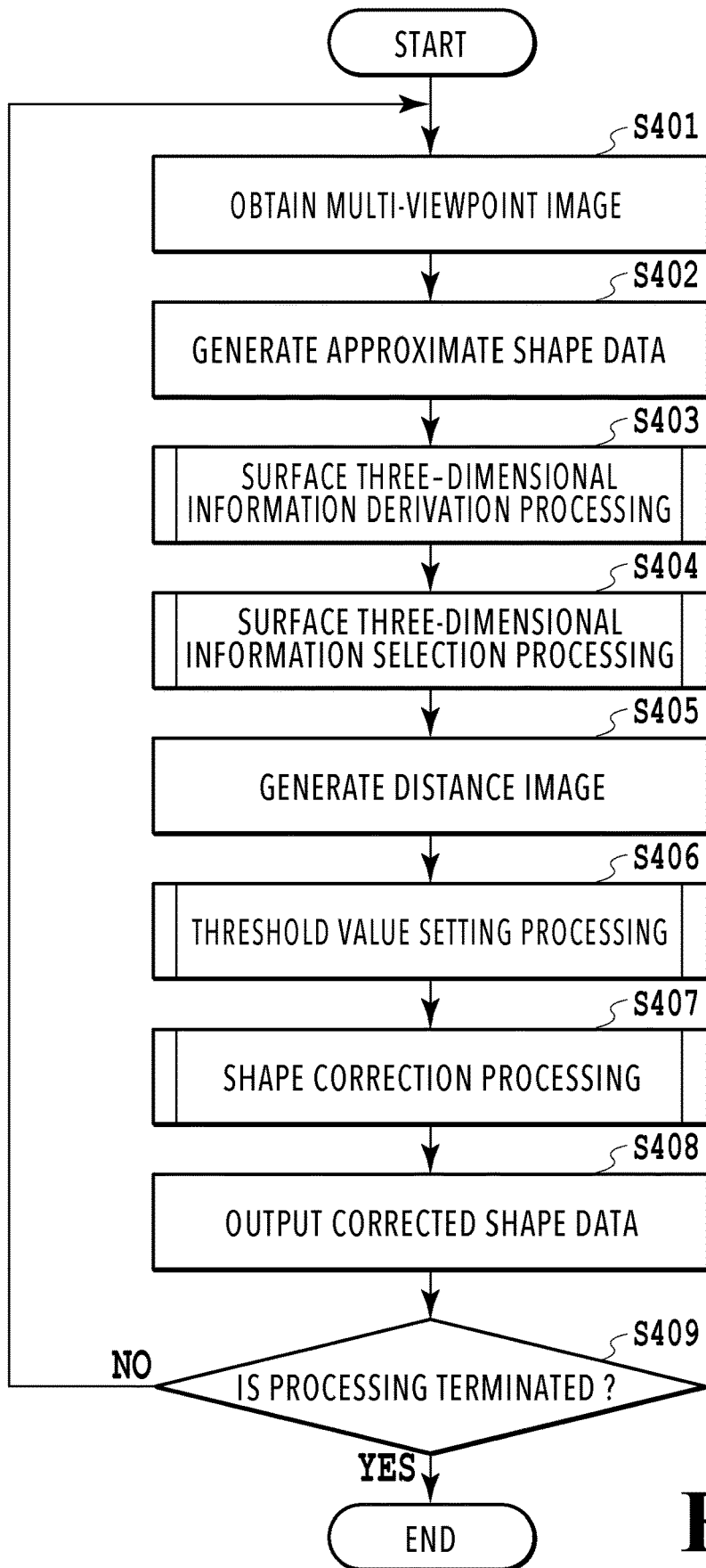
FIG. 4 is a flowchart showing a flow of processing that is performed by the image processing apparatus according to the first embodiment.

FIG. 3 is a diagram showing a function configuration (software configuration) example of the image processing apparatus 102 and FIG. 4 is a flowchart showing a flow of the processing by each function unit. The series of processing shown in the flowchart in FIG. 4 is implemented by the CPU 201 reading a program stored in the ROM 203 or the HDD 204 onto the RAM 202 and executing the program. In the following, the flow until three-dimensional shape data with high accuracy is generated in the image processing apparatus 102 is explained along the flowchart in FIG. 4. In the following explanation, a symbol "S" means a step.

Figure 5:
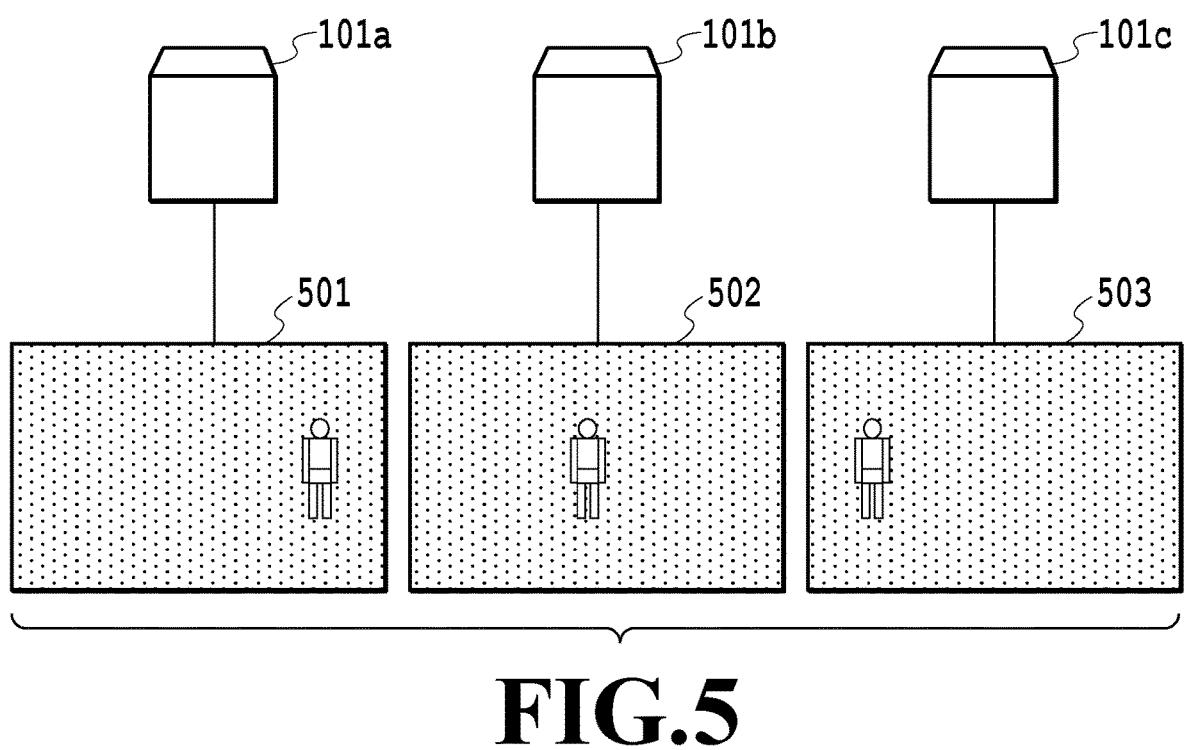
FIG. 5 is a diagram showing one example of captured images.

At S401, a captured image obtaining unit 301 obtains a plurality of captured images (multi-viewpoint image) whose viewpoints are different obtained by synchronous image capturing from the 12 cameras 101a to 101l via the input I/F 206. Alternatively, it may also be possible to obtain the multi-viewpoint image stored in the HDD 204. The data of the obtained multi-viewpoint image is stored in the RAM 202. FIG. 5 shows captured images obtained by the three cameras 101a to 101c facing in the same direction among the 12 cameras 101. Here, the three cameras 101a to 101c capture the object 107 from front. A captured image 501 corresponds to the camera 101a, a captured image 502 corresponds to the camera 101b, and a captured image 503 corresponds to the camera 101c. In a case where a moving image including a plurality of frames is input, each frame at the same time corresponds to the multi-viewpoint image. That is, in a case where a multi-viewpoint image of a moving image is input, each piece of processing at S401 and subsequent steps is performed for each frame.

Figure 6:
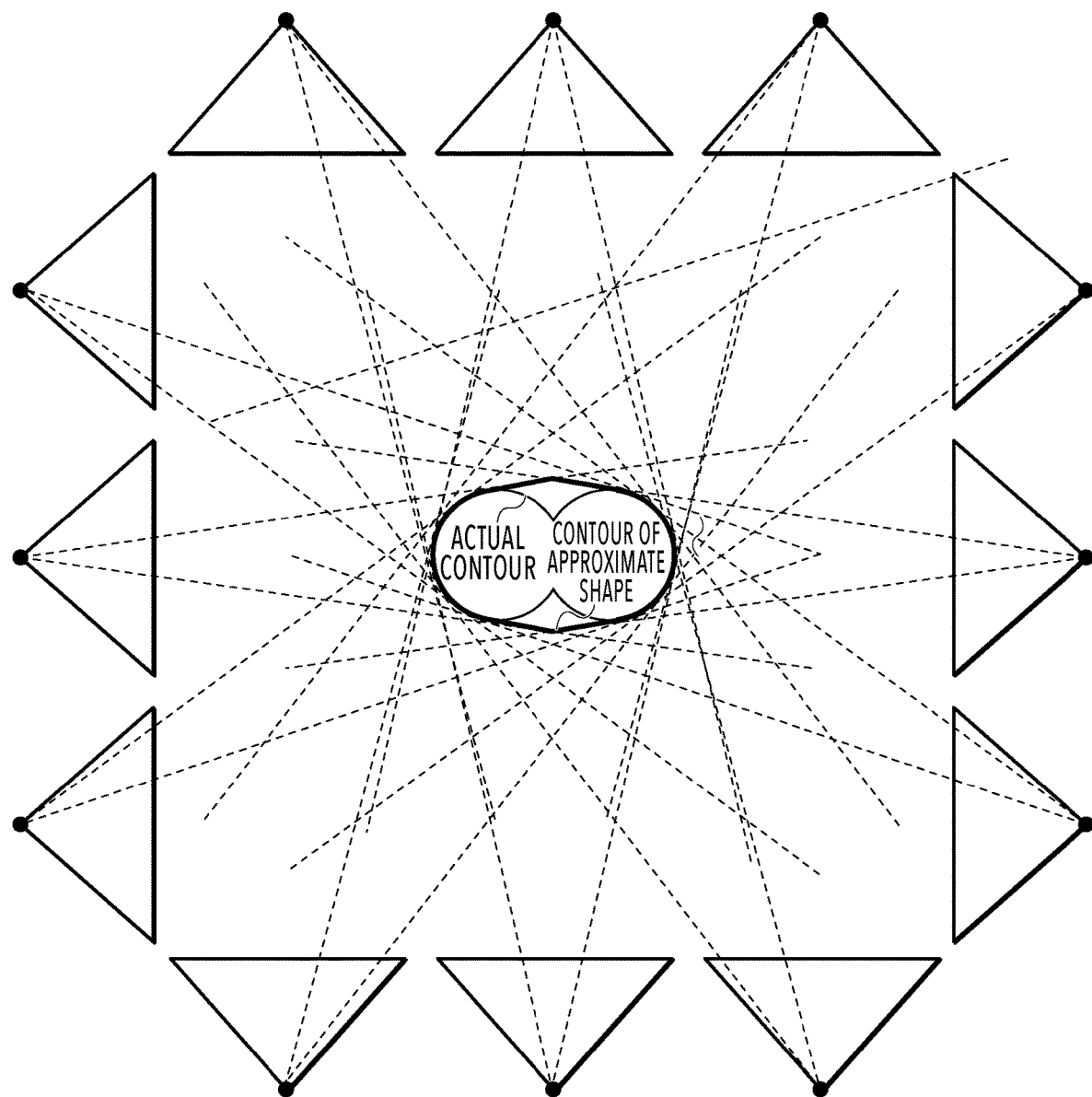
FIG. 6 is a diagram explaining obtaining of an approximate shape by the visual hull method.

At S402, an approximate shape generation unit 302 generates three-dimensional shape data (approximate shape data) representing an approximate shape of the object 107 captured in the multi-viewpoint image obtained at S401. Although there are a variety of formats of the three-dimensional shape data, in the present embodiment, it is assumed that explanation is given by taking a case as an example where approximate shape data in the voxel format representing the three-dimensional shape by a set of minute cubes called "voxel" is generated by the visual hull method. First, the approximate shape generation unit 302 obtains an image (called "silhouette image" and "foreground image") representing the silhouette of the object 107 captured within the captured image based on the difference from the background image for each of a plurality of captured images captured in synchronization. As the background image for obtaining the silhouette image, it may be possible to store an image in the HDD 204 or the like, which is obtained by performing image capturing in advance in the state where, for example, the object 107 is not in the image capturing space 106. Then, based on the camera parameters of each camera 101, each voxel included in the voxel set corresponding to the image capturing space 106 is projected onto each silhouette image. Then, only the voxels projected within the silhouette of the object 107 in all the silhouette images are left. The voxel set including the voxels left as described above is taken to be approximate shape data of the object 107. FIG. 6 is a diagram explaining the way the voxel set as the approximate shape data of the object is obtained by the visual hull method. In a case of a gourd-shaped object as shown in FIG. 6, the approximate shape data that is obtained by the visual hull method takes the shape as an ellipsoid including the entire object. That is, even in a case where there is a concave portion in the actual object, the concave portion is not represented by the voxel set. The method of obtaining approximate shape data is not limited to the visual hull method. For example, it may also be possible to obtain approximate shape data by performing position adjustment and transformation processing in accordance with the multi-viewpoint image for the basic model prepared in advance for each object. In this case, by using a depth sensor and the like, the three-dimensional orientation of a person is estimated and a basic model of the person is obtained in advance by using joint information obtained therefrom. Alternatively, it may also be possible to obtain three-dimensional coordinates of the area corresponding to the object based on a distance image obtained by separately using, for example, a low-resolution distance camera and taking the cube (rectangular parallelepiped and the like) circumscribing the area as approximate shape data.

At S403, a surface three-dimensional information derivation unit 303 obtains three-dimensional information on the surface (in the following, called "surface three-dimensional information") corresponding to the contour of the object. Specifically, first, from each captured image configuring the multi-viewpoint image, points (feature points) characterizing the captured object are extracted. Then, the three-dimensional coordinates of the position obtained by projecting two feature points (feature point pair) extracted from different captured images and in a correspondence relationship onto the image capturing space 106 are obtained. In the following, the point representing the three-dimensional position within the image capturing space, which corresponds to the feature point pair, is called "spatial correspondence point". Details of the surface three-dimensional information derivation processing will be described later.

At S404, a surface three-dimensional information selection unit 304 selects only surface three-dimensional information whose reliability is high from among the surface three-dimensional information obtained at S403 based on the approximate shape data generated at S402. In the present embodiment, spatial correspondence points of a large number of feature point pairs are obtained as surface three-dimensional information, and therefore, spatial correspondence points whose reliability is higher are selected therefrom.

Details of the surface three-dimensional information selection processing will be described later.

Figure 7:
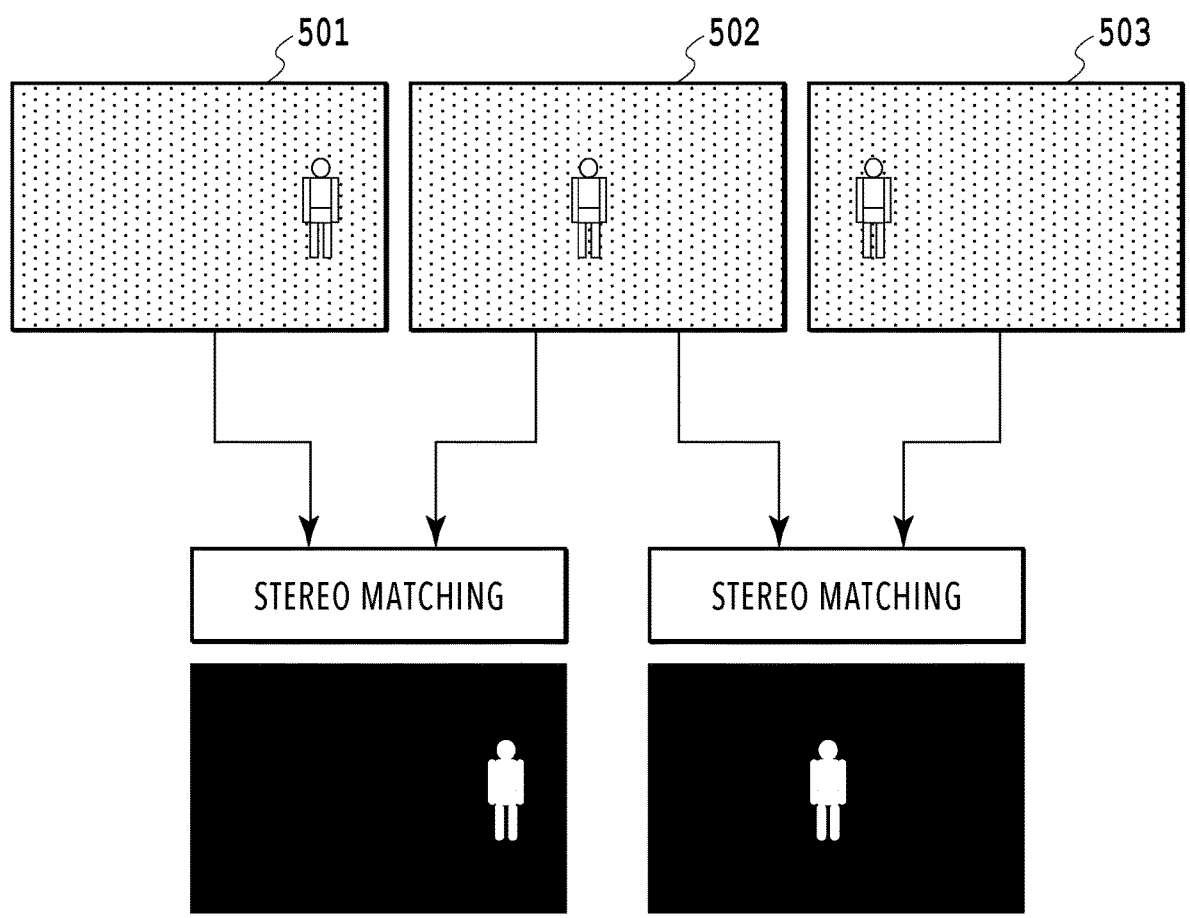
FIG. 7 is a diagram showing a generation example of a distance image.
Figure 8A:
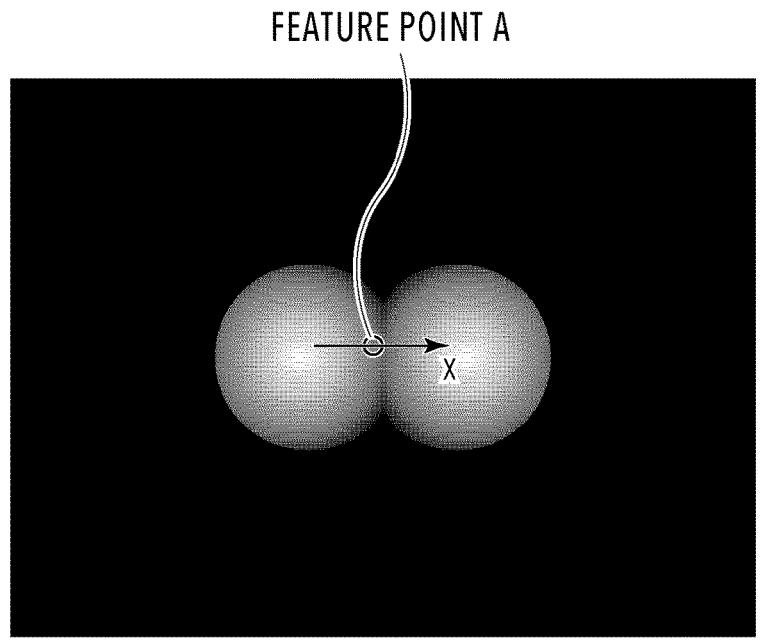
FIG. 8A is a diagram showing one example of a distance image of a gourd-shaped object and FIG. 8B and FIG. 8C are each a diagram showing a change in depth value before and after correction of the distance image.
Figures 8B, 8C:
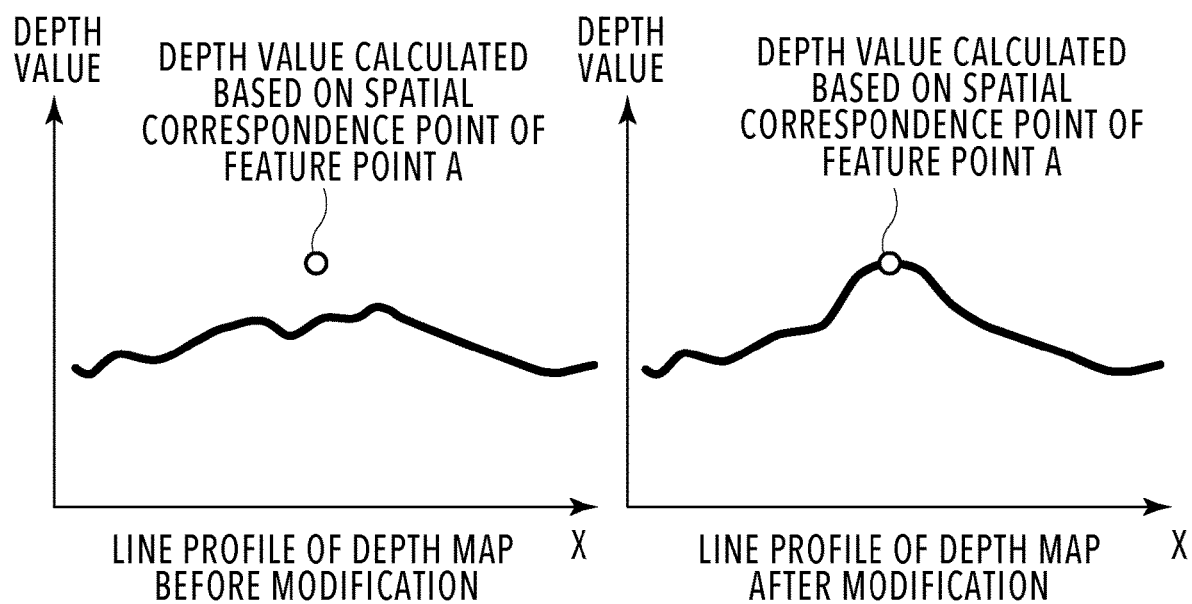

At S405, a distance image generation unit 305 generates a distance image representing the distance from each camera 101 to the object based on the multi-viewpoint image obtained at S401. This distance image is generally also called "depth map". In the present embodiment, a distance image is generated by stereo matching using two captured images corresponding to two adjacent cameras. FIG. 7 shows the way a distance image is generated based on the captured images 501 to 503 corresponding to the three cameras 101a to 101c, respectively, shown in FIG. 5 described previously. As the stereo matching, there is a block matching method, a semi-global matching method or the like. In the block matching method, the captured image corresponding to one of the two adjacent cameras is taken to be a reference image and the captured image corresponding to the other camera is taken to be a target image and the pixel corresponding to the pixel of interest of the reference image is searched for from the target image and a disparity in the pixel of interest is found. Then, based on camera parameters, the disparity in the pixel of interest is converted into a depth and taken to be the pixel value in the distance image. By performing the above processing for each pixel of the reference image, the distance image corresponding to the reference image is obtained. By the processing such as this, a distance image 701 corresponding to the captured image 501 is obtained from the captured image 501 and the captured image 502 and a distance image 702 corresponding to the captured image 502 is obtained from the captured image 502 and the captured image 503. Further, the distance image generation unit 305 modifies the distance image obtained as described above based on the surface three-dimensional information selected at S404. Specifically, processing to cause the depth value of the pixel on the distance image, which corresponds to each feature point, to become closer to the depth value calculated based the spatial correspondence point is performed. FIG. 8A shows the distance image in a case where the gourd-shaped object shown in FIG. 6 exists in the image capturing space and FIG. 8B and FIG. 8C show the change in the depth value before and after modification of the distance image, respectively. As shown in FIG. 8B, the depth value calculated based on the spatial correspondence point of a feature point A located at the center of the concave portion of the object is very distant from the line profile of the depth map before modification. This is modified to the line profile of the depth map after modification as shown in FIG. 8C. In this example, after the depth value of the pixel on the distance image, which corresponds to the feature point A, is replaced with the depth value calculated based on the spatial correspondence point, the depth value of the pixel on the periphery thereof is further changed so that the change becomes smooth. By the modification such as this, even in a case where the depth value on the periphery of the pixel on the distance image is erroneous, which corresponds to a certain feature point, it is possible to change the depth value to an appropriate depth value based on the selected surface three-dimensional information, and therefore, a distance image with higher accuracy is obtained. The generation method of a distance image is not limited to the above-described stereo matching method. For example, it may also be possible to use a camera capable of obtaining distance information by ToF (Time of Flight) or pattern projection.

At S406, a threshold value setting unit 306 sets a threshold value (threshold value for determining a deletion-target unit element among unit elements configuring approximate shape data) that is used in the next shape correction processing for each small space (in the following, called "local space") obtained by dividing the image capturing space into spaces of a predetermined size. The larger the threshold value that is set here, the more likely the unit element configuring the approximate shape data remains, and therefore, resistance to errors of the distance image is increased. Details of the threshold value setting processing will be described later.

At S407, a shape correction unit 307 corrects the approximate shape data generated at S402 based on the distance image generated at S405 and the threshold value set at S406. Specifically, the shape correction unit 307 performs processing to delete an unnecessary unit element estimated not to represent the shape of the object among the unit elements configuring the approximate shape data. Details of the shape correction processing will be described later.

At S408, an output unit 308 outputs the approximate shape data corrected at S407, that is, the three-dimensional shape data representing the three-dimensional shape of the object more accurately to the storage device 104 and the display device 105 via the output I/F 207.

At S409, whether to continue or terminate the generation processing of the three-dimensional data of the object is determined based on, for example, the user instructions input via the UI 103, and the like. In a case where the generation processing is continued, the processing returns to S401 and the series of processing is continued for a new multi-viewpoint image.

The above is the flow until a three-dimensional shape with high accuracy is generated in the image processing system in FIG. 1. In the above-described example, the case is explained as an example where one object is captured in the captured image, but it is also possible to apply the image processing system to a case where a plurality of objects is captured. In this case, first, at S402, the voxel set obtained by the visual hull method is separated for each linked component and the separated voxel set is obtained as the approximate shape data for each object. Then, it is sufficient to apply the shape correction processing to each piece of the obtained approximate shape data at S407.

<Surface Three-Dimensional Information Derivation Processing>

Figure 9:
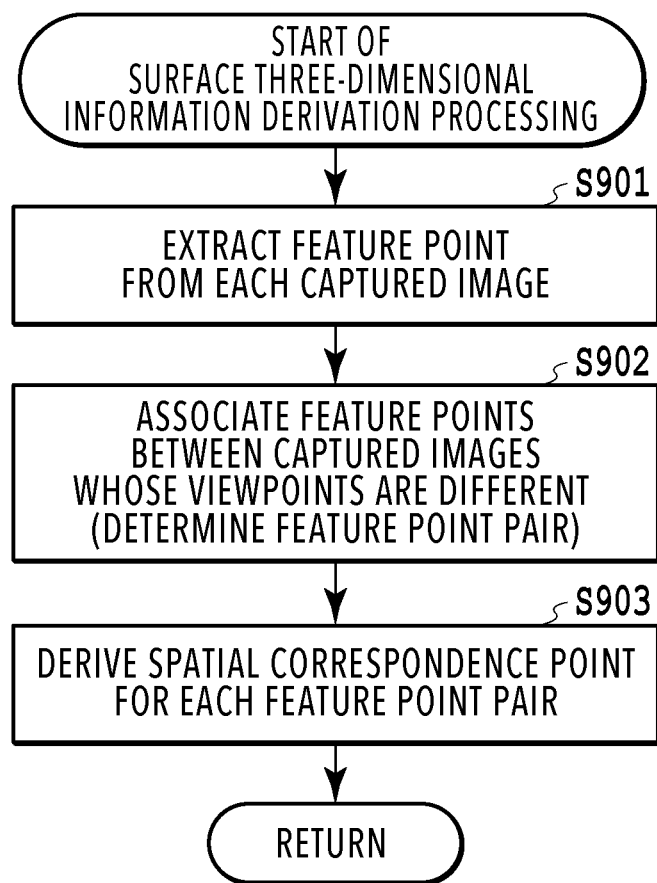
FIG. 9 is a flowchart showing details of processing to obtain surface three-dimensional information according to the first embodiment.

FIG. 9 is a flowchart showing details of the surface three-dimensional information derivation processing (S403) according to the present embodiment, which is performed by the surface three-dimensional information derivation unit 303. In this processing, by associating the feature points extracted from each captured image between different captured images, the spatial correspondence point of the feature point is obtained as surface three-dimensional information. In the following, detailed explanation is given along the flow in FIG. 9.

At S901, a feature point is extracted from each captured image configuring the multi-viewpoint image. For the feature point extraction, it may be possible to apply a publicly known method, for example, such as SIFT (Scale-Invariant Feature Transform) and SURF (Speeded-Up Robust Features). In a case of SIFT, after a feature point is detected by using a DoG (Difference of Gaussian) filter or the like, processing to describe the feature amount is performed based on the orientation calculated from the gradient direction and the gradient strength.

At S902, processing to associate the feature points extracted from each captured image at S901 between two captured images whose viewpoints are different is performed. In the present embodiment, for each combination of captured images corresponding to two different cameras, processing to associate each feature point extracted from one of the captured images with the feature point that minimizes the distance between the feature points among the feature points extracted from the other captured image is performed. In this manner, a combination of feature points in the correspondence relationship (in the following, called "feature point pair") is determined. It may also be possible to determine in advance a combination of captured images whose feature points are to be associated with each other based on camera parameters. For example, it may also be possible to determine in advance a pair of cameras the distance between which is within a predetermined range and the difference in the light axis (orientation of camera) between which is within a predetermined range and associate feature points with each other between the captured images obtained by the pair of the cameras.

Figure 10:
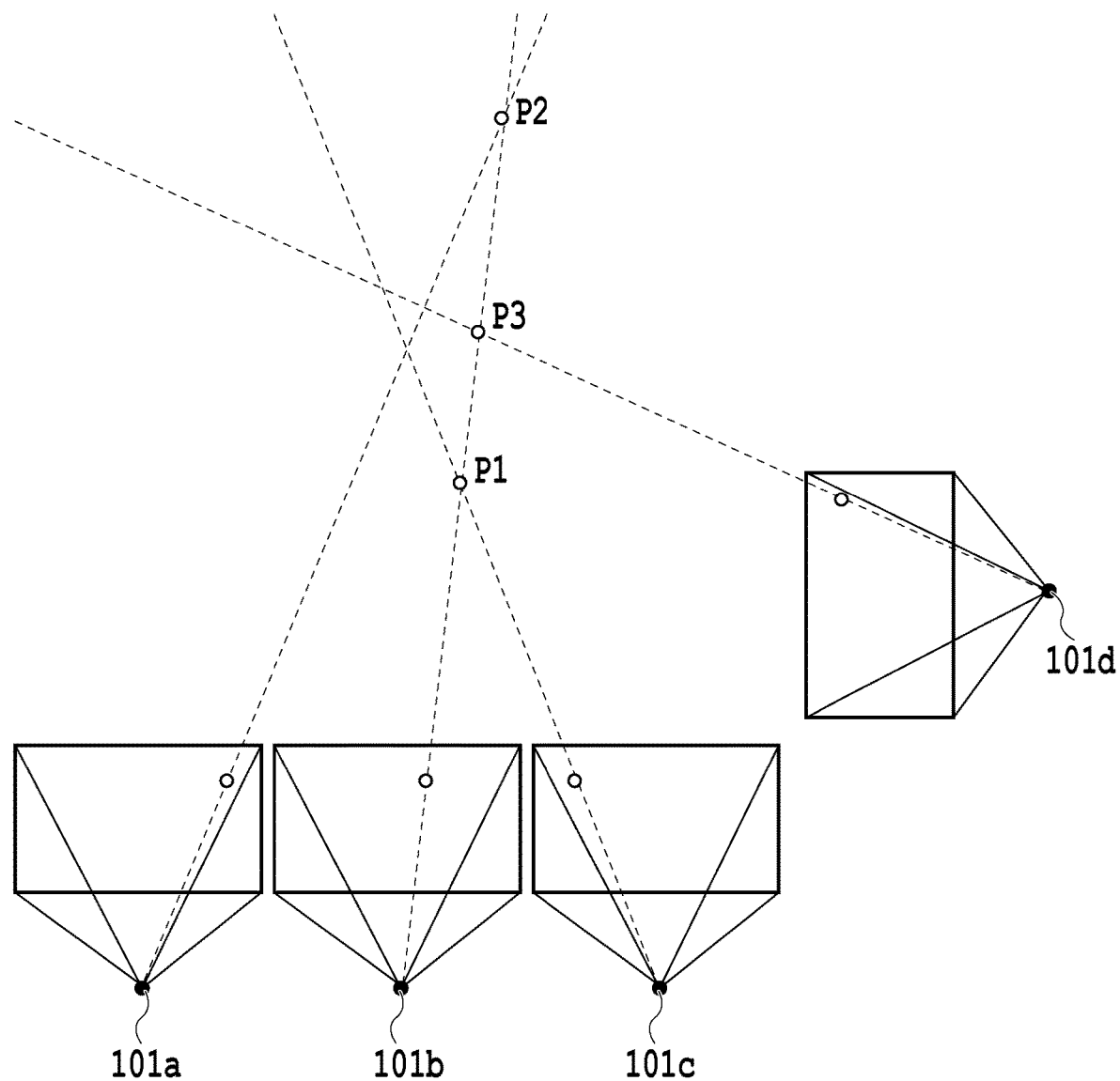
FIG. 10 is a diagram explaining the way a spatial correspondence point is derived from a feature point pair.

At S903, for each feature point pair obtained at S902, the above-described spatial correspondence point is derived. Specifically, based on the camera parameters of the two cameras having captured the two captured images from which the feature points of the target feature point pair are extracted, the two rays corresponding to the feature points are found and the intersection of the two rays is determined to be the spatial correspondence point. In a case where the two rays do not intersect, it may be possible to determine the middle point of the segment that minimizes the distance between the two rays to be the spatial correspondence point thereof. Further, in a case where the distance between the two rays is larger than a predetermined value, it is determined that the association between the feature points of the feature point pair is wrong and they may be excluded from the spatial correspondence point derivation target. FIG. 10 is a diagram showing the way the spatial correspondence point is derived from the feature point pair. Here, in FIG. 10, three spatial correspondence points p1 to p3 are shown. The spatial correspondence point p1 is the spatial correspondence point derived from a feature point pair of a feature point f0 in the captured image of the camera 101b and a feature point f1 in the captured image of the camera 101c. The spatial correspondence point p2 is the spatial correspondence point derived from a feature point pair of the feature point f0 in the captured image of the camera 101b and a feature point f2 in the captured image of the camera 101a. The spatial correspondence point p3 is the spatial correspondence point derived from a feature point pair of the feature point f0 in the captured image of the camera 101b and a feature point f3 in the captured image of the camera 101d. As described above, at this step, for each feature point pair obtained at S902, the spatial correspondence point is derived and information on the spatial correspondence point for each feature point pair is obtained as surface three-dimensional information.

The above is the contents of the surface three-dimensional information derivation processing according to the present embodiment.

<Surface Three-Dimensional Information Selection Processing>

Figure 11:
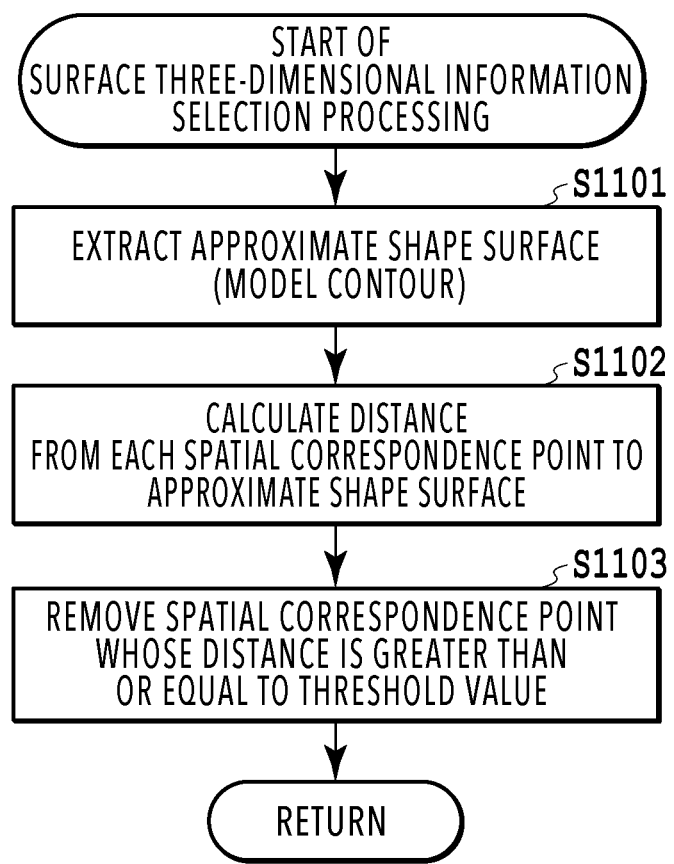
FIG. 11 is a flowchart showing details of processing to select surface three-dimensional information according to the first embodiment.

FIG. 11 is a flowchart showing details of the processing (S404) to select surface three-dimensional information whose reliability is high from among the surface three-dimensional information obtained by the surface three-dimensional information derivation unit 303, which is performed by the surface three-dimensional information selection unit 304. In the surface three-dimensional information selection processing of the present embodiment, processing to leave only the spatial correspondence points whose distance to the surface of the three-dimensional shape represented by the approximate shape data is small among the spatial correspondence points derived for each feature point pair and remove the other spatial correspondence points is performed. In the following, along the flow in FIG. 11, the surface three-dimensional information selection processing is explained in detail.

At S1101, based on the approximate shape data generated at S402, the surface (contour) of the three-dimensional shape is extracted. In the following, the shape surface that is extracted from the approximate shape data is called "approximate shape surface". In a case where the approximate shape data is the voxel format, voxels adjacent to the background among the voxels included in the voxel set representing the three-dimensional shape of the object are specified and the set of the specified voxels is extracted as the approximate shape surface. In a case where the approximate shape data is the point cloud format, as in the case of the voxel format, it is sufficient to extract the set of point clouds adjacent to the background as the approximate shape surface. Further, in a case of the mesh format, it is sufficient to extract each polygon surface configuring the mesh as the approximate shape surface.

At S1102, for each spatial correspondence point obtained for each feature point pair in the flow in FIG. 9, the distance to the approximate shape surface extracted at S1101 is calculated. In a case of the present embodiment where the approximate shape surface is represented by the set of voxels adjacent to the background, the distances from the three-dimensional position of the spatial correspondence point to all the voxels included in the set of voxels are found and the shortest distance is taken to be the distance from the spatial correspondence point to the approximate shape surface. Here, "distance to voxel" is the distance to the three-dimensional coordinates of the voxel center and is represented, for example, in units of millimeters. The processing such as this is performed for all the spatial correspondence points whose three-dimensional coordinates are derived.

Figure 12:
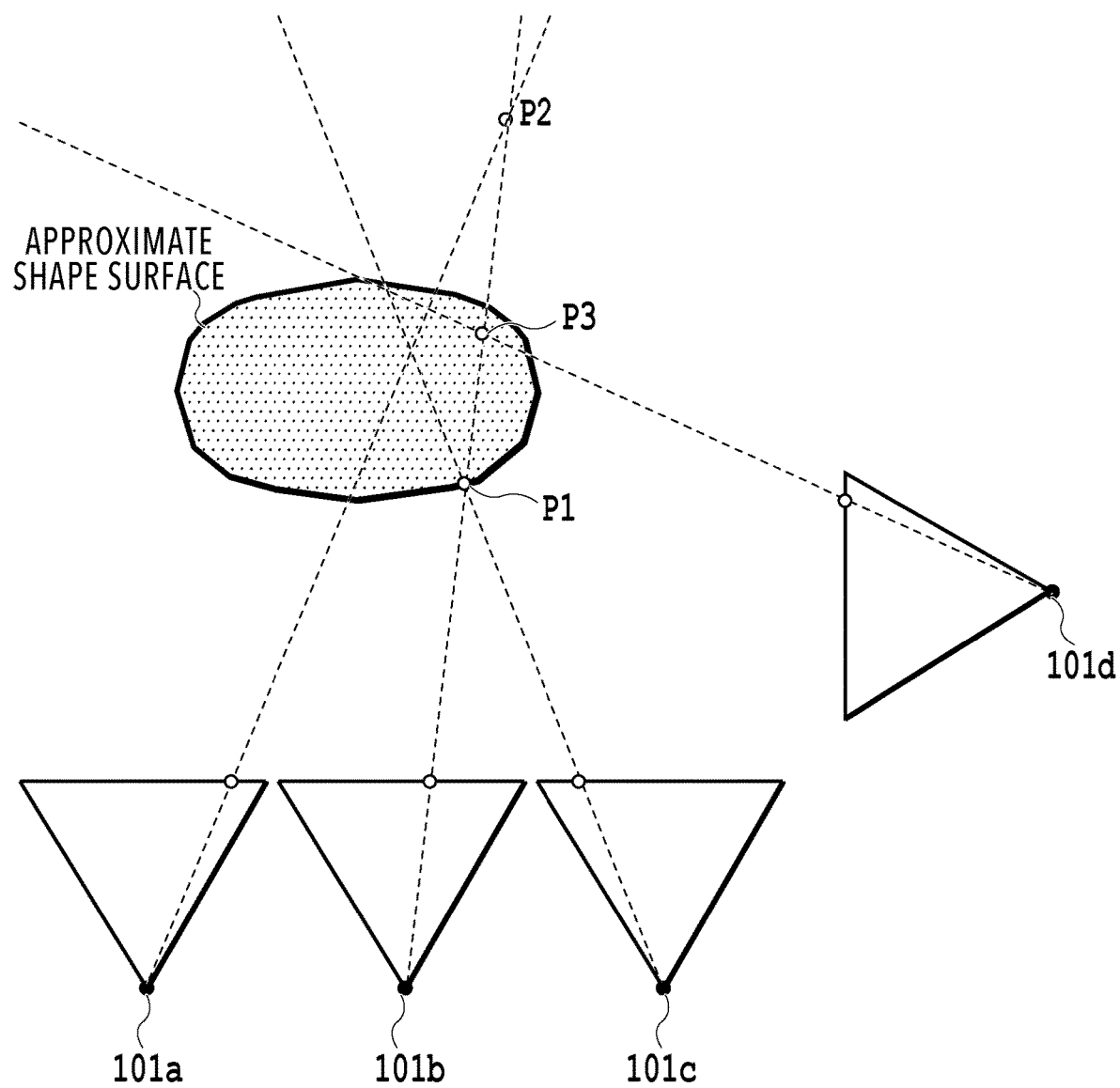
FIG. 12 is a diagram explaining selection of a spatial correspondence point.

At S1103, based on the distance calculated for each spatial correspondence point at S1102, only the spatial correspondence points whose reliability is high are left and the other spatial correspondence points are removed. Specifically, processing to leave only the spatial correspondence points whose distance to the approximate shape surface is less than or equal to a predetermined distance and delete the spatial correspondence points whose distance to the approximate shape surface is larger than the predetermined distance is performed. Here, the predetermined distance is defined, for example, such as "n×voxel resolution (n is a certain number)", for each voxel resolution and set in advance based on to what extent (thickness) correction is desired to be performed for the approximate shape surface. FIG. 12 is a diagram explaining the way the selection of the present embodiment is performed by taking the three spatial correspondence points p1 to p3 shown in FIG. 10 described previously as the target. Here, in a case where it is assumed that the distance calculated for each of p1, p2, and p3 is d1, d2, and d3, respectively, and p1 is located on the approximate shape surface, $0=d1<d3<d2$ holds. Here, in a case where the predetermined distance is less than d3, among the three spatial correspondence points p1 to p3, only the spatial correspondence point p1 whose distance to the approximate shape surface is zero remains and the spatial correspondence points p2 and p3 are deleted.

The above is the contents of the surface three-dimensional information selection processing according to the present embodiment. By this processing, it is possible to remove the spatial correspondence point derived from the feature point pair whose association has been erroneous, that is, the spatial correspondence point whose reliability is low and leave only the spatial correspondence point whose reliability is high.

<Threshold Value Setting Processing>

Figure 13:
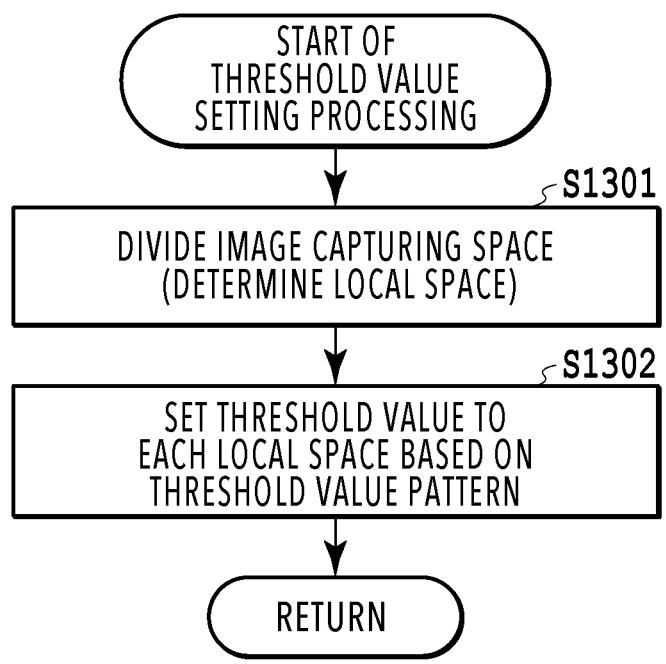
FIG. 13 is a flowchart showing details of threshold value setting processing according to the first embodiment.

FIG. 13 is a flowchart showing details of the threshold value setting processing (S406) that is performed by the threshold value setting unit 306. In the threshold value setting processing of the present embodiment, for each local space obtained by dividing the image capturing space in accordance with the division condition determined in advance, a threshold value is set based on a threshold value pattern prepared in advance. In the following, the threshold value setting processing is explained in detail along the flow in FIG. 13.

At S1301, in accordance with the division condition determined in advance, the image capturing space is divided into a plurality of local spaces. In the present embodiment, the image capturing space is divided at regular intervals in accordance with the number of divisions determined in advance in the longitudinal direction and in the transverse direction into small spatial units each of which is a rectangular parallelepiped. In the following, each individual small space obtained by division is called "local space". The above-described division method is one example and the division method is not limited to this. For example, it may also be possible to divide the image capturing space so that the closer to the center of the image capturing area, the smaller the division interval is, in place of the regular interval. Further, it may also be possible to divide the image capturing space so that the shape of the local space is another shape, for example, such as a tetrahedron.

At S1302, for each local space into which the image capturing space is divided at S1301, a threshold value is set based on a threshold value pattern determined in advance. In the present embodiment, the threshold value is set to each individual local space by using a threshold value pattern designed so that the closer the local space is to the center of the image capturing space, the larger the threshold value is set, for example, as shown in FIG. 14A and FIG. 14B. The contents of the threshold value pattern are arbitrary and for example, it may also be possible to create a threshold value pattern with which the threshold value in the local space in which an object without any concave portion exists is different from the threshold value in the local space in which an object with a concave portion exists. Further, it may also be possible to store threshold value patterns created in the past and enable a user to select and designate a threshold value pattern from among them.

The above is the contents of the threshold value setting processing. Instead of using the number of divisions and the threshold value pattern determined in advance, it may also be possible for a user to designate the number of divisions and the threshold value pattern each time, for example, via the user interface screen (UI screen) shown in FIG. 14C. Alternatively, it may also be possible to make it possible to designate an arbitrary threshold value for each local space. The UI screen in FIG. 14C shows the two-dimensional number of divisions and threshold value pattern in a case where the image capturing space is viewed from directly above and the height direction (Z-axis direction) is common among the plurality of numbers of divisions and the plurality of threshold value patterns.

<Shape Correction Processing>

Figure 15:
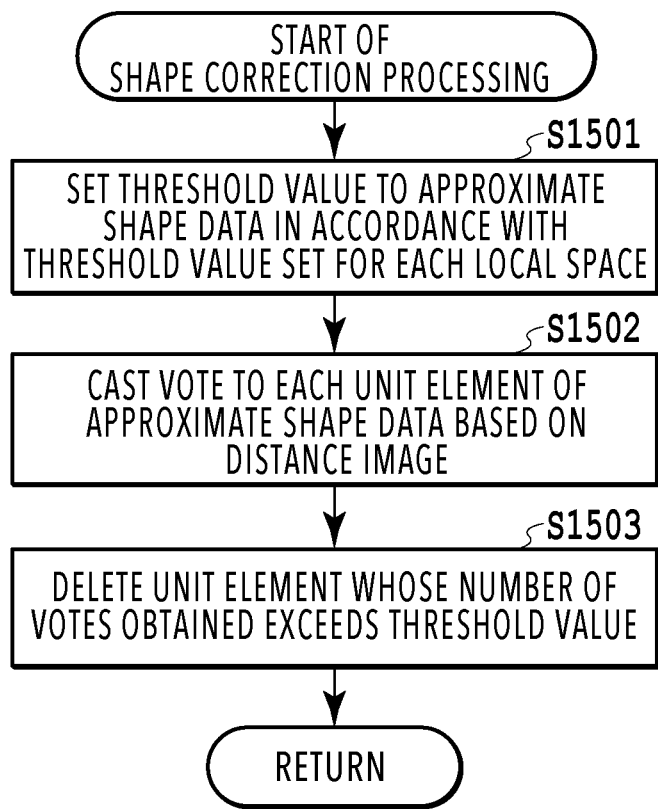
FIG. 15 is a flowchart showing details of processing to correct an approximate shape.

FIG. 15 is a flowchart showing details of the processing (S407) to correct the approximate shape data generated at S402, which is performed by the shape correction unit 307. In the present embodiment, the processing to evaluate approximate shape data based on the distance image and delete the unit element estimated not to represent the shape of the object among the unit elements configuring the approximate shape data based on the results of the evaluation is performed. In the following, detailed explanation is given along the flow in FIG. 15.

At S1501, to the approximate shape data, a threshold value for determining whether a voxel is the deletion-target voxel is set. Specifically, first, the coordinates of the center of gravity of the voxel set representing the approximate shape are calculated. Then, the local space including the calculated coordinates of the center of gravity is specified and to the specified local space, the threshold value set in the threshold value setting processing described previously to the specified local area is set as the threshold value that is applied to the approximate shape data. Due to this, for example, in a case where the threshold value is set to each local space in accordance with the threshold value pattern shown in FIG. 14A and FIG. 14B described previously, to the approximate shape data of the object existing at the center of the image capturing space, the threshold value "2" is set. Further, similarly, to the approximate shape data of the object existing at the end of the image capturing space, the threshold value "1" is set.

At S1502, based on the distance image generated at S405, evaluation for each voxel configuring the voxel set representing the approximate shape is performed. This evaluation is performed by the vote cast to the voxel deemed to be unnecessary. The distance images are generated so as to correspond to the number of cameras 101 and the processing is performed in order for all the generated distance images. Specifically, the voxel of interest is determined sequentially from the voxel set and the depth value at the pixel position on the distance image, which corresponds to the voxel of interest, and the depth value from the camera corresponding to the processing-target distance image to the voxel of interest are compared and in a case where the latter depth value is smaller, one vote is cast to the voxel of interest. This is equivalent to addition of "1" as the evaluation value. Due to this, the stronger the possibility of the voxel not representing the original object shape, the larger the number of votes cast (accumulated value of evaluation value) to each voxel configuring the voxel set representing the approximate shape is. Here, for the depth value comparison, formula (1) below is used.

$$D^*_{vi} < D_i(px_{vi}, py_{vi}) \tag{1}$$

In formula (1) described above, $D^*_{vi}$ represents the depth value from a voxel center v to the camera corresponding to a distance image i. Further, $D_i(x, y)$ represents the depth value of the pixel position in the distance image i specified by coordinates (x, y). Further, $(x_{vi}, y_{vi})$ are coordinates indicating the pixel position in a case where the voxel center v is projected onto the distance image i. In this case, it is possible to obtain "depth value at the pixel position on the distance image, which corresponds to the voxel of interest" by the following procedure. First, based on the camera parameters of the camera corresponding to the distance image i, the voxel center v of the voxel of interest is projected onto the distance image and the coordinates $(x_{vi}, y_{vi})$ on the distance image i, which corresponds to the voxel of interest, are obtained. Next, the depth value at the coordinates $(x_{vi}, y_{vi})$ in the distance image i is obtained by taking the depth value of the pixel as the depth value in a case where the pixel exists at the corresponding position, or by finding the depth value of the peripheral pixel by the interpolation calculation (nearest neighbor interpolation and the like) in a case where the pixel does not exist at the corresponding position. The value thus found is taken to be the depth value at the pixel position on the distance image, which corresponds to the voxel of interest. Then, it is possible to obtain "depth value from the camera corresponding to the distance image to the voxel of interest" by the following procedure. First, based on the camera parameters of the camera corresponding to the distance image i, the voxel center v of the voxel of interest is converted into that in the coordinate system with reference to the camera corresponding to the distance image i. Next, the depth (dimensions in the longitudinal direction and in the transverse direction are ignored) to the converted voxel center v is found. The value thus found is taken to be the depth value from the camera corresponding to the distance image to the voxel of interest.

Figure 16:
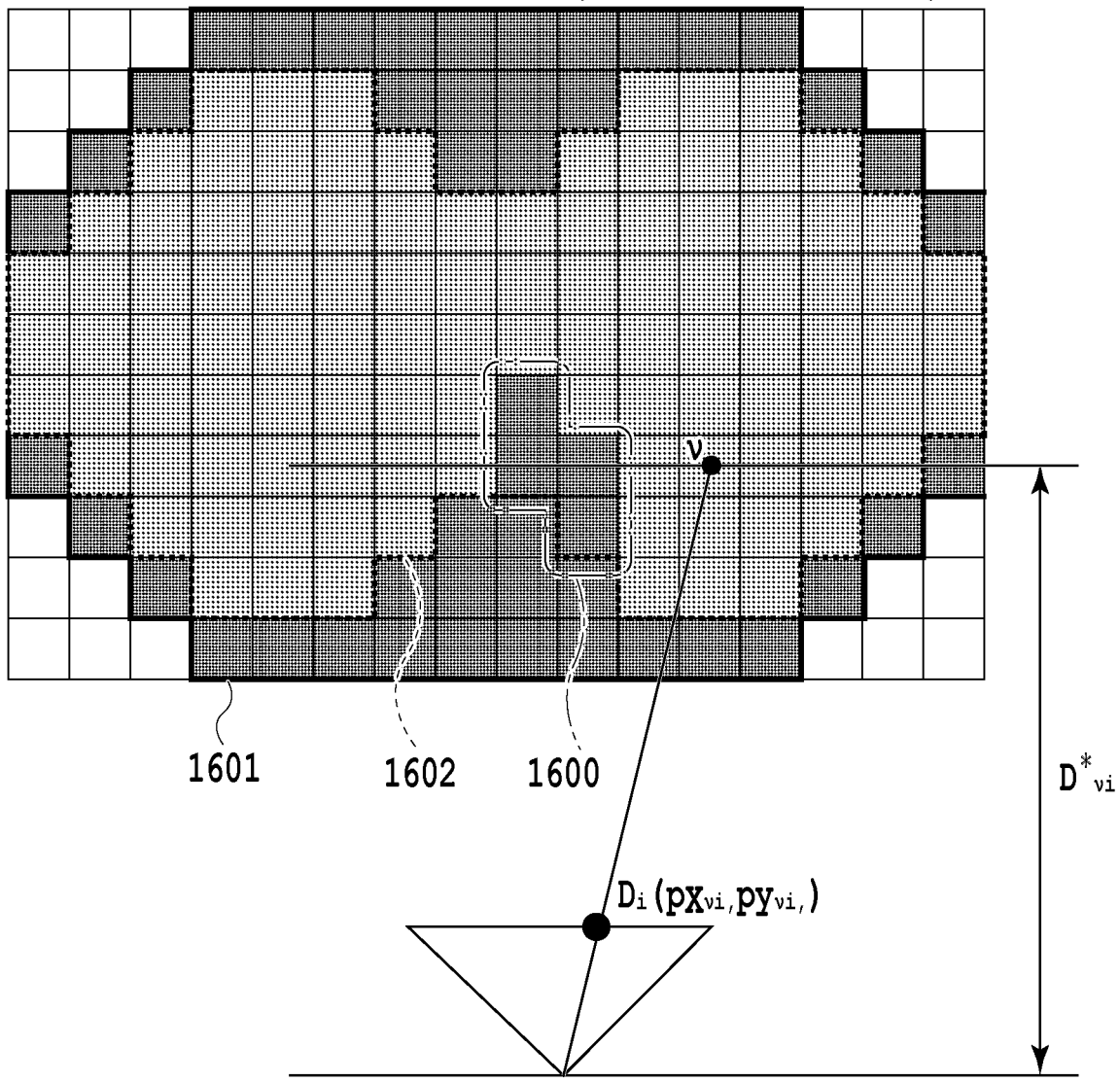
FIG. 16 is a diagram showing one example of results of voting for a voxel set.

Then, in a case where the voxel of interest satisfies the condition in formula (1) described above, one vote (evaluation value "1") is added to the voxel of interest. As a result of the processing such as this, in a case where the depth values in all the distance images are correct (that is, in a case where an erroneous depth value is not included in any distance image), the number of votes cast to the voxel representing the original object shape is "0". In a case where one distance image including an erroneous depth value exists in the distance images corresponding to each camera, the number of votes cast to the voxel representing the original object shape is "1". FIG. 16 is a diagram showing one example of the results of the voting for the voxel set representing the approximate shape of the gourd-shaped object shown in FIG. 6. As a result of the existence of a distance image including an erroneous depth value for the voxel corresponding to the concave portion at the center of the object, one vote is also cast to four voxels 1600 that should not be deleted. In the present embodiment, 12 distance images corresponding to each of the 12 cameras 101 are obtained, and therefore, the processing as described above is repeated 12 times.

At S1503, based on the results of the voting (results of evaluation), the voxel whose number of votes obtained (=accumulated value of evaluation value) is larger than or equal to the threshold value set at S1501 is deleted from the voxel set representing the approximate shape. Here, with reference to FIG. 16 described above, the deletion of voxel based on the results of the voting is explained. In FIG. 16, a thick line 1601 indicates the contour of the voxel set before correction representing the approximate shape. Here, in a case where the threshold value "2" is set to the approximate shape data, the voxel whose number of votes obtained is larger than or equal to "2" is deleted and the voxel whose number of votes obtained is less than or equal to "1" remains. As a result of that, the voxel set is corrected to that having the contour indicated by a broken line 1602.

The above is the contents of the shape correction processing. In a case where the approximate shape data is the point cloud format, it is possible to apply the above-described shape correction processing by reading "voxel" in the above-described explanation as "point", but in a case of the mesh format, it is not possible to apply the above-described shape correction processing as it is. In a case where the approximate shape data is given in the mesh format, after performing conversion of the data format, which replaces the area surrounded by meshes with the voxel set, the flow in FIG. 15 described above is applied. Then, in a case where it is desired to output the corrected shape data in the original mesh format, it is sufficient to output the shape data by converting the data format into the mesh format again.

As above, according to the present embodiment, the surface three-dimensional information on the object is obtained from each captured image used to generate the approximate shape data of the object and the distance image is corrected based on the surface three-dimensional information. Then, by correcting the approximate shape data based on the corrected distance image, it is possible to restore the three-dimensional shape with high accuracy even in a case of an object having a complicated shape with a concave portion.

Modification Example 1

Figure 17:
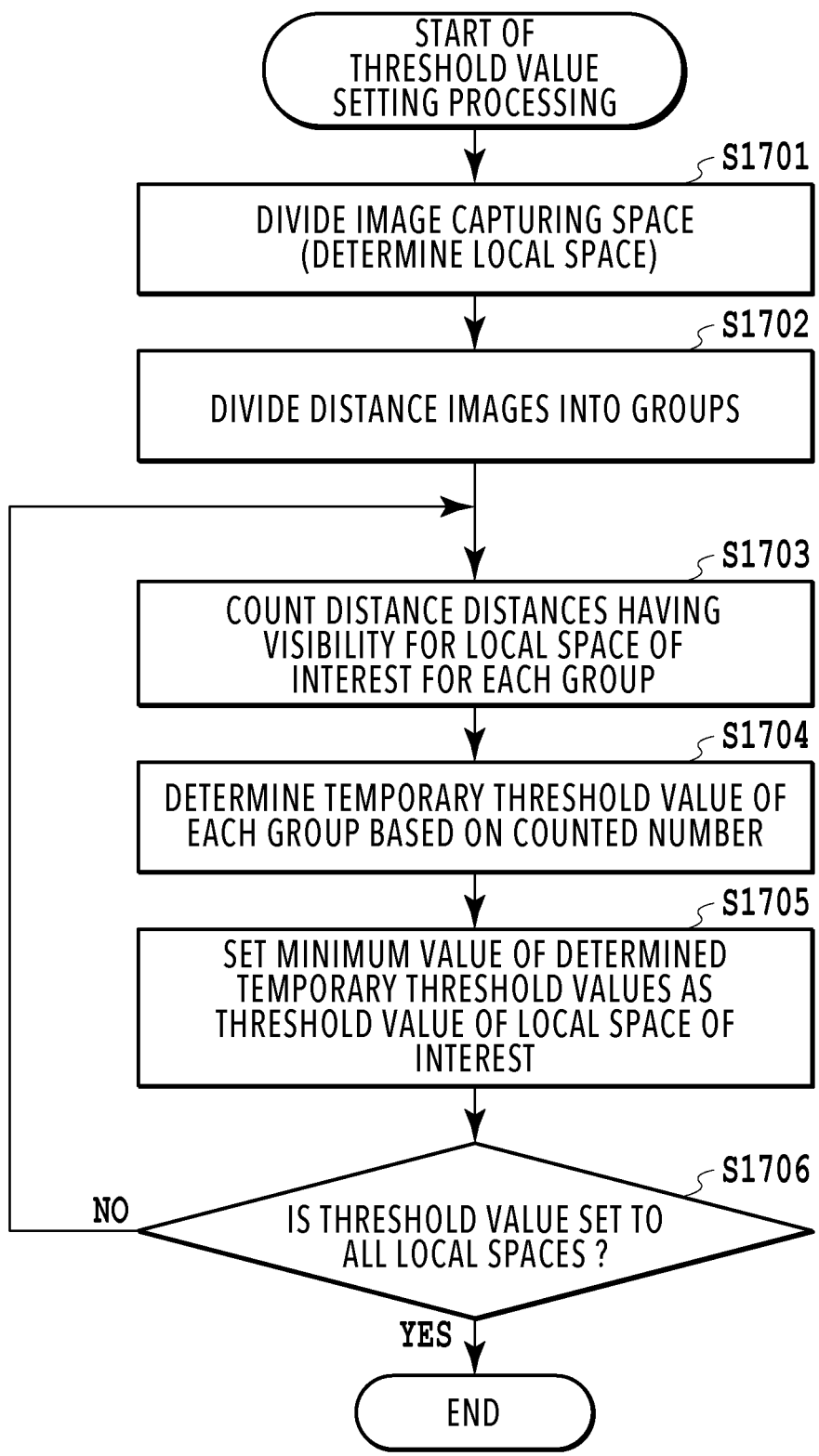
FIG. 17 is a flowchart showing details of threshold value setting processing according to modification example 1 of the first embodiment.

In the above-described threshold value setting processing, the image capturing space is divided into a predetermined number of local spaces and a threshold value is set to the local space based on the threshold value pattern prepared in advance, but the threshold value setting method is not limited to this. For example, it may also be possible to divide the distance images into groups and set a threshold value to the local space based on the visibility of each local space of the distance image belonging to each group. FIG. 17 is a flowchart showing details of threshold value setting processing according to the present modification example. In the following, along the flow in FIG. 17, the threshold value setting processing of the present modification example is explained.

S1701 is the same as S1301 described previously and the image capturing space is divided into a plurality of local spaces in accordance with the division condition determined in advance. At S1702 that follows, the distance images corresponding to each of the plurality of cameras are divided so that the distance images corresponding to the cameras having the common image capturing direction belong to the same group based on the image capturing direction specified by the camera parameters of the camera. Here, the distance images are divided into four groups, that is, a first group to a fourth group. The above-described grouping is merely one example and for example, it may also be possible to divide the distance images so that that the distance images whose position and orientation indicated by the camera parameters are similar to each other belong to the same group.

At S1703, for each group, the number of distance images having visibility for the local space of interest among all the local spaces is counted. Here, "distance image having visibility" means a distance image including the local space of interest within the viewing angle thereof and in the following, is described as "visible distance image".

At S1704, based on the number of visible distance images found for each group, a temporary threshold value for the local space of interest is determined for each group. Here, the temporary threshold value is taken to be a value smaller than the counted number of visible distance images. FIG. 18A to FIG. 18D each show a temporary threshold value for a local space 1801 determined for each group (first group to fourth group) in each direction in a case where six cameras are arranged in each of the four directions whose angles are different by 90 degrees from the adjacent directions so that the cameras surround an image capturing space 1800. In this example, in each group, by using six captured images by the six cameras, five distance images are obtained by performing stereo matching between captured images of the adjacent cameras. Next, the number of visible distance images is counted for the five distance images. Then, in each group, in a case where the local space of interest belongs to the area whose number of visible distance images is "2", the temporary threshold value is determined to be "1", and in a case where the local space of interest belongs to the area whose number of visible distance images is larger than or equal to "3", the temporary threshold value is determined to be "2".

Figure 19:
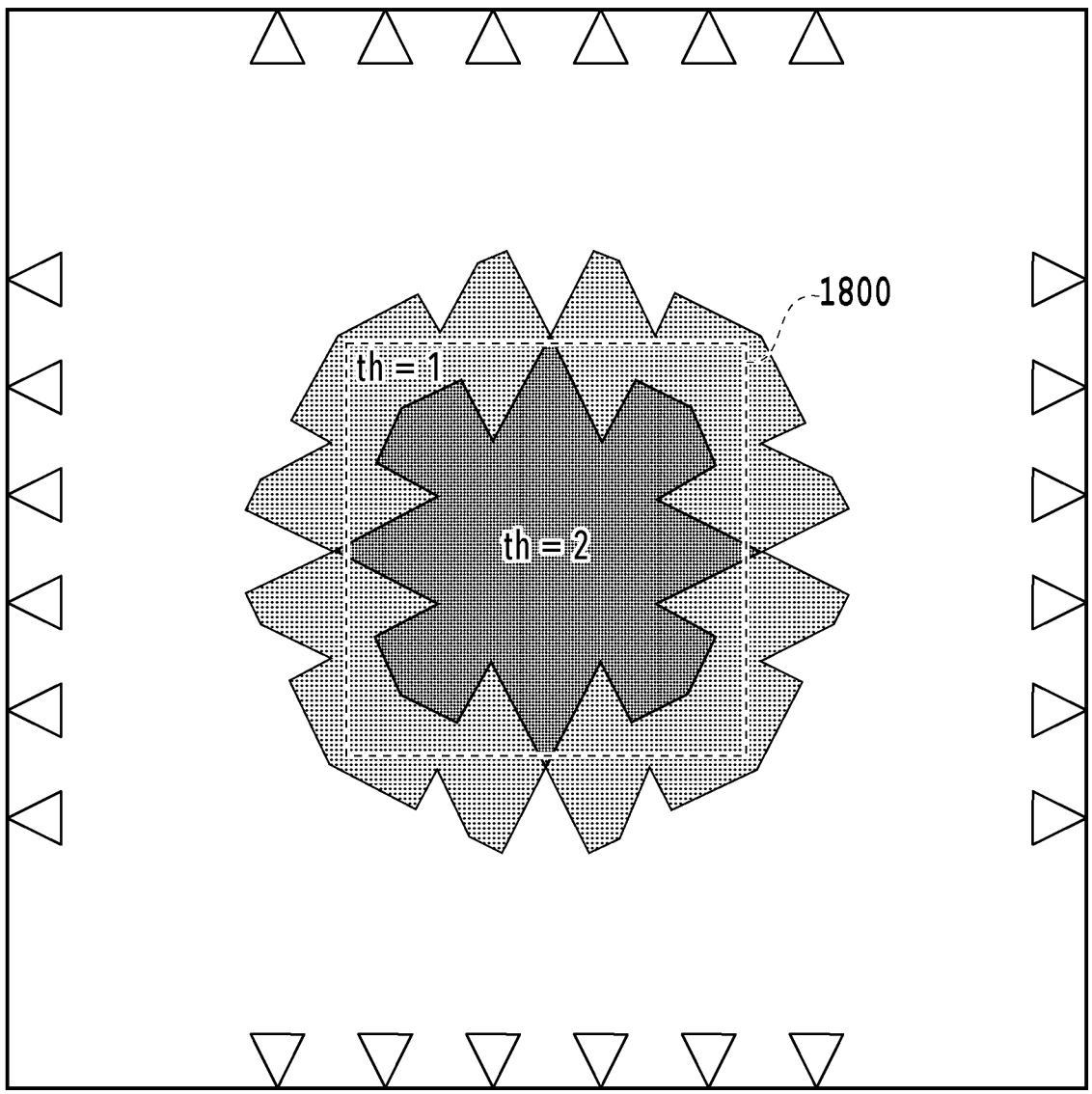
FIG. 19 is a diagram showing a distribution of threshold values set within an image capturing space.

At S1705, the minimum value among the temporary threshold values determined for each group at S1704 is set as the threshold value for the local space of interest. FIG. 19 is a diagram showing a distribution of threshold values set based on the temporary threshold values for each group shown in FIG. 18 described above. The distribution in the height direction is omitted, but it is assumed that the same threshold values are set. In FIG. 19, it can be seen that to the local space belonging to the area represented in dark gray within the image capturing space 1800, "2" is set as the threshold value and to the local space belonging to the area represented in light gray, "1" is set as the threshold value. At S1706, the processing that is performed next is distributed in accordance with whether or not the threshold value setting of all the local space is completed. In a case where there is an unprocessed local space, the processing is returned to S1703, and the next local space of interest is set and the threshold value setting is continued. On the other hand, in a case where the threshold value setting of all the local space is completed, this processing is terminated.

As described above, it may also be possible to set the threshold value for each local space based on the distance images divided into the groups. In the present modification example, the distance images are divided into the four groups, but the number of groups into which the distance images are divided is not limited to four. Further, in the present modification example, the distance images are divided so that the groups are exclusive to one another, but it may also be possible to divide the distance images so that some distance images overlap between groups.

Modification Example 2

Figure 20:
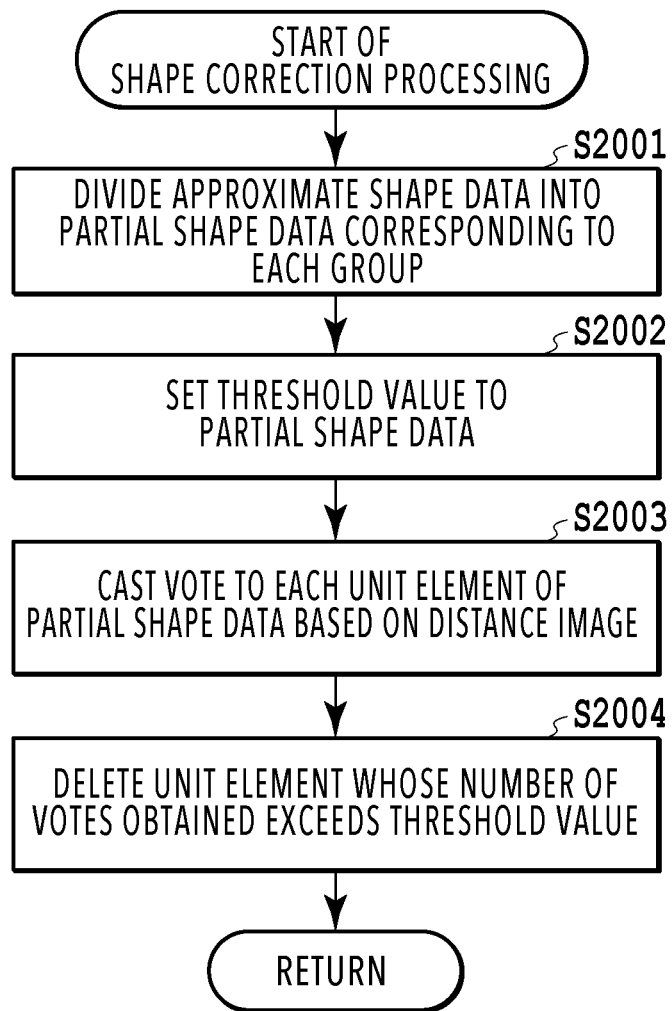
FIG. 20 is a flowchart showing details of shape correction processing according to modification example 2 of the first embodiment.

In the above-described embodiment, the minimum value among the temporary threshold values determined for each group is set as the threshold value for the local space and the one threshold value is set to each local space. However, it may also be possible to set the temporary threshold values determined for each group as the threshold values for the local space as they are. In this case, it is sufficient to divide the approximate shape data in accordance with the image capturing direction and perform shape correction by applying each of the plurality of threshold values to the divided shape data. In the following, along the flowchart shown in FIG. 20, shape correction processing according to the present modification example is explained.

Figure 21:
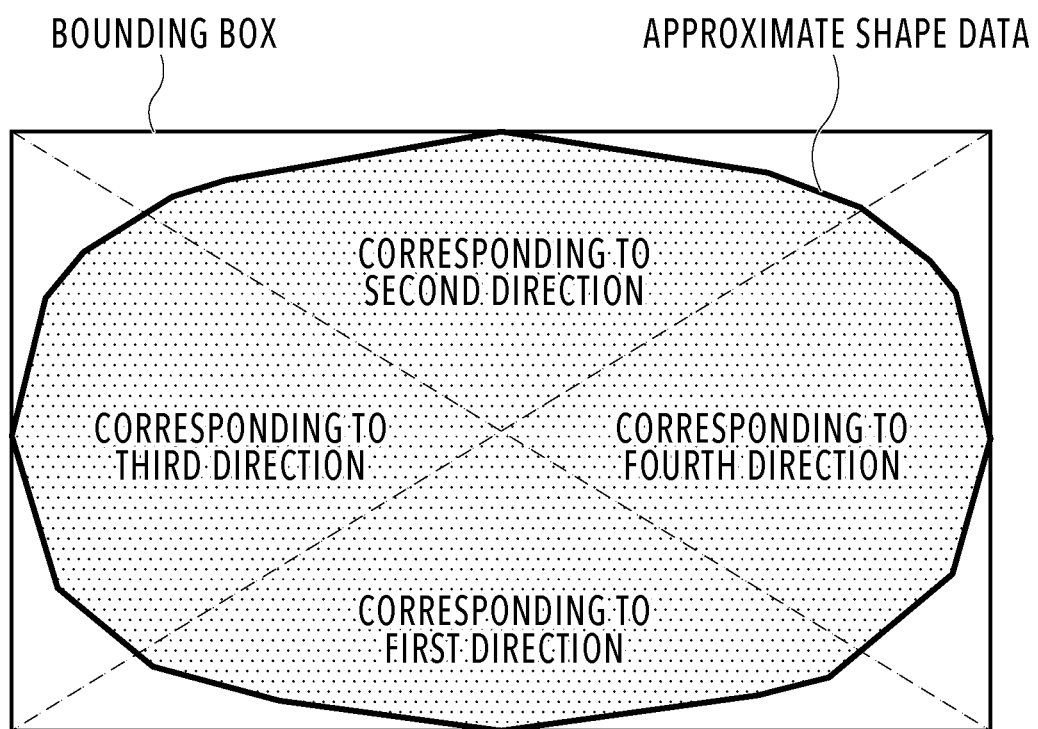
FIG. 21 is a diagram showing the way approximate shape data is divided.

At S2001, the approximate shape data is divided in accordance with the groups described previously. In the example described previously in which the approximate shape data is divided into the four groups for each image capturing direction, it is sufficient to divide the approximate shape data into four groups based on the sides passing through vertices of a bounding box including the voxel set as the approximate shape data. FIG. 21 is a diagram showing the way the approximate shape data having the contour as shown in FIG. 12 is divided in accordance with the four groups described previously. Data representing part of the approximate shape data, which is obtained by the division, is called "partial shape data". At next S2002, based on the temporary threshold value corresponding to each group, the threshold value is set to each piece of partial shape data. Specifically, the coordinates of the center of gravity of the voxel set as the partial shape data are found and the temporary threshold value for each group, which is determined for the local space to which the coordinates of the center of gravity belong, is set as the threshold value as it is. Here, it is assumed that the temporary threshold value for the local space 1801 is set in each group in each of the first to the fourth directions as shown in FIG. 18A to FIG. 18D described previously. In this case, in the example in FIG. 21 described above, the threshold value "2" is set to the partial shape data corresponding to the first direction, the third direction, and the fourth direction and the threshold value "1" is set to the partial shape data corresponding to the second direction. S2003 that follows corresponds to S1502 in the flow in FIG. 15 described previously. That is, for the voxel set as each piece of partial shape data, based on the distance images generated at S405, a vote is cast to each voxel. It may also be possible to limit the distance images that are referred to in a case of voting to those in the same group as the group of the target partial shape data. S2004 corresponds to S1503 in the flow in FIG. 15 described previously. That is, for the voxel set as each piece of partial shape data, based on the results of the voting, the voxel whose number of votes obtained is larger than or equal to the threshold value set at S2002 is deleted from the voxel set.

The above is the contents of the shape correction processing according to the present modification example. In the present modification example, it is also possible to restore the three-dimensional shape of an object with high accuracy.

Other Modification Examples

In the above-described embodiment, the selected surface three-dimensional information is utilized for correction of the distance image, but the utilization method thereof is not limited to this. For example, it may also be possible to use the selected surface three-dimensional information for the setting of a search range in a case where the pixel within the target image is specified, which corresponds to the pixel of interest of the reference image. Specifically, based on the three-dimensional coordinates of the spatial correspondence point of the feature point pair, the search range in the vicinity of the feature point in the reference image is set narrower. Because the search range originally corresponds to the range in which an object can exist, by utilizing the spatial correspondence point of the feature point pair, which is the surface three-dimensional information on the object, it is possible to set an appropriate search range.

Further, in the above-described embodiment, the threshold value is set to each local space, but in a case where a plurality of objects exists within the image capturing space, it may also be possible to set the threshold value different for each object. For example, it may also be possible to set a smaller threshold value to an object whose shape is simpler, such as to set a threshold value to a person (player) larger than that to a ball. Alternatively, in a case where a plurality of persons exists within the image capturing space, it may also be possible to change the threshold value for a person for whom correction is necessary from that for a person for whom correction is not necessary. In a case where a different threshold value is set to each object, it is sufficient to determine the object by template matching and the like at S1501 and set a predetermined threshold value prepared in advance for each object.

Further, in the above-described embodiment, one threshold value is set to the entire approximate shape data, but it may also be possible to set a different threshold value to each part (for example, in a case of a person object, to each region, such as head, arm, torso, and leg) of the three-dimensional shape represented by the approximate shape data. In this case, first, the voxel set representing the approximate shape is divided into a plurality of voxel sets (approximate shape data for each part) corresponding to each part. Then, it is sufficient to specify the coordinates of center of gravity of each piece of approximate shape data of each part and take the threshold value corresponding to the local space in which the coordinates of center of gravity are included as the threshold value for the approximate shape data of each part.

Further, in the above-described embodiment, the approximate shape data is corrected in accordance with the number of votes cast to each voxel based on the distance image, but it may also be possible to weight each distance image. For example, in a case where the distance resolution is different for each distance image, it may also be possible to set a heavier weight to a distance image whose distance resolution is higher, and so on. By doing so, the distance image whose distance resolution is higher is reflected more in the evaluation results. Alternatively, it may also be possible to set a light weight to the area that should not be corrected in the approximate shape represented by the voxel set, or correct the number of votes obtained to a smaller number. For example, by reducing the weight of the voxel whose distance to the approximate shape surface is longer than a predetermined value, it is possible to make the voxel more unlikely to be deleted. It may also be possible to control the contribution rate in the evaluation results by weighing each distance image and the approximate shape data as described above.

Further, in the above-described embodiment, the distance image is corrected based on the spatial correspondence point of the feature point pair and the approximate shape data is corrected based on the corrected distance image, but it may also be possible to correct the approximate shape data based on the distance image before correction. In this case, the processing by the surface three-dimensional information derivation unit 303 and the surface three-dimensional information selection unit 304 is skipped.

Further, in the above-described embodiment, whether to delete each voxel is determined by performing processing to compare the number of votes cast to each voxel configuring the voxel set representing the approximate shape and the set threshold value. However, in a case where the common threshold value "1" is set to all the local spaces, the determination processing by the threshold value comparison is no longer necessary. That is, it may be possible to immediately delete the voxel that satisfies formula (1) described above in one of distance images. Due to this, it is made possible to perform shape correction processing more simply.

Second Embodiment

Figure 22:
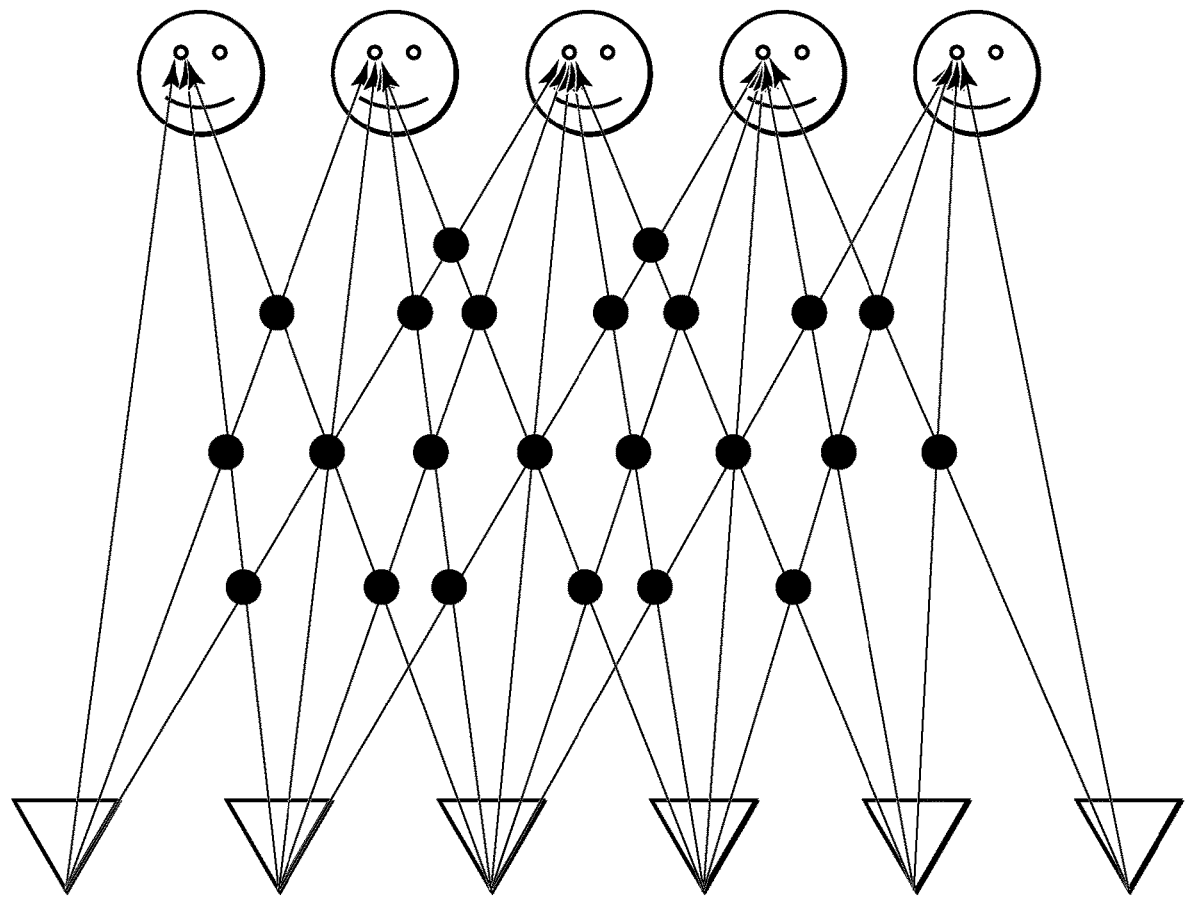
FIG. 22 is a diagram explaining a problem that is a premise of a second embodiment.
Figure 23:
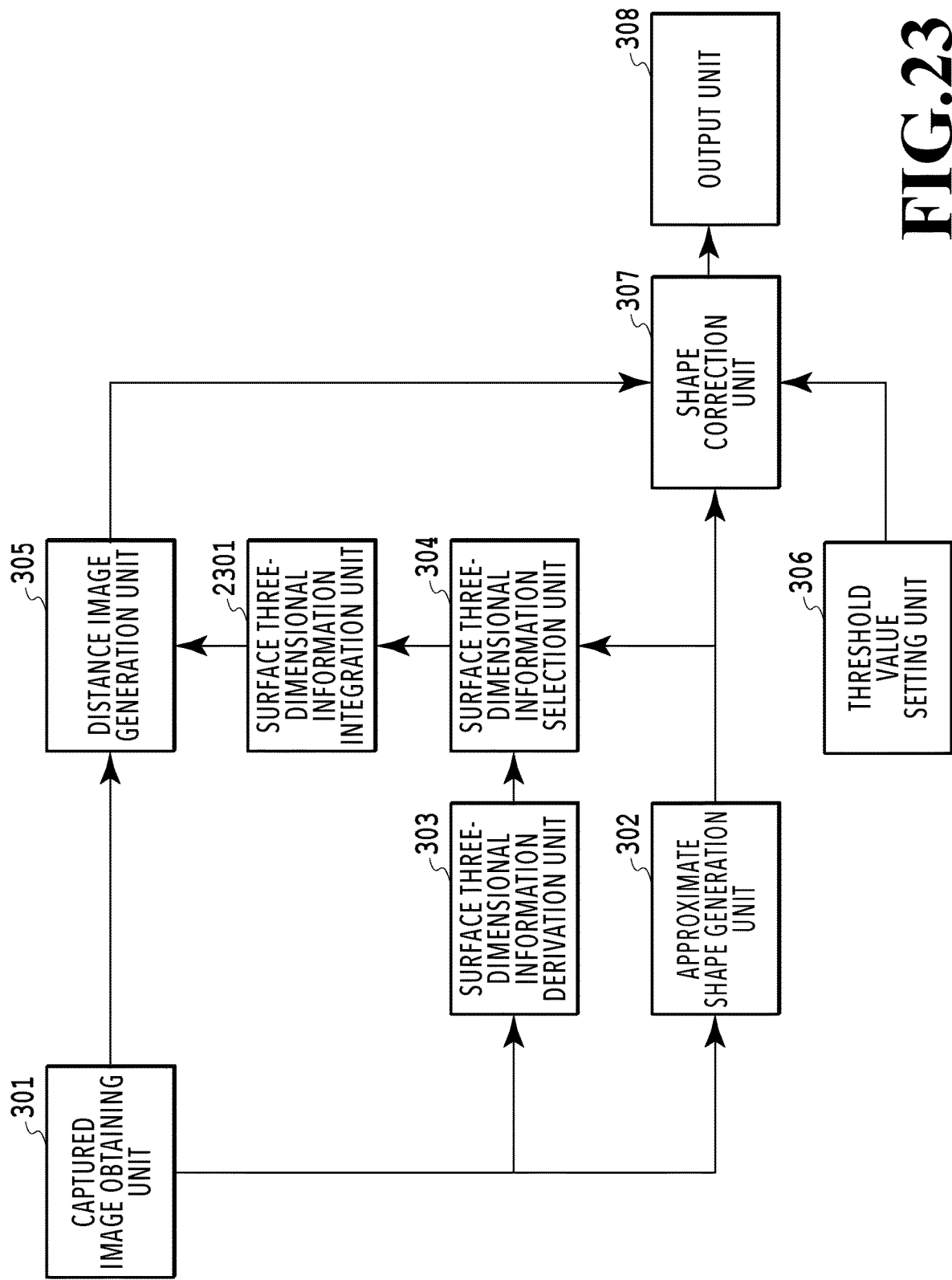
FIG. 23 is a diagram showing a function configuration (software configuration) example of an image processing apparatus according to the second embodiment.
Figure 24:
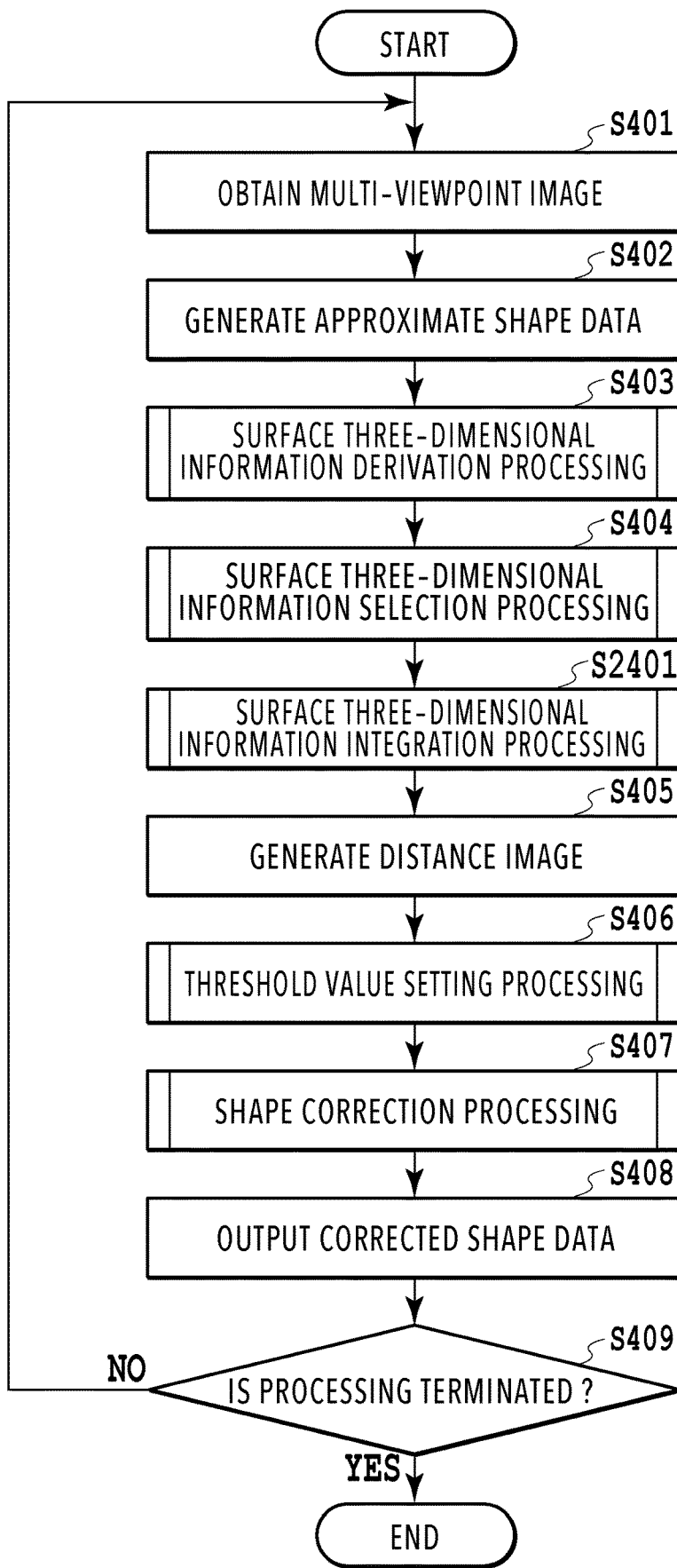
FIG. 24 is a flowchart showing a flow of processing that is performed by the image processing apparatus according to the second embodiment.
Figure 25:
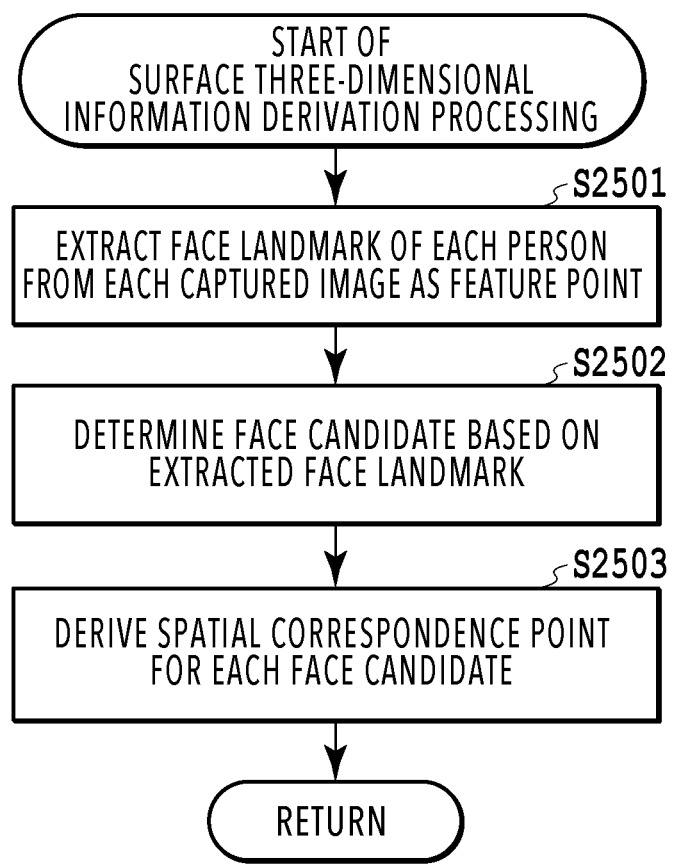
FIG. 25 is a flowchart showing details of processing to obtain surface three-dimensional information according to the second embodiment.

As described previously, even in a case where a plurality of objects is captured, it is possible to apply the above-described first embodiment. Here, a case is supposed where a plurality of objects of the same type exists in a multiple-viewpoint image that is input (for example, a plurality of persons is captured side by side). In the case such as this, in the surface three-dimensional information derivation processing, two or more points (generally called "face landmark") corresponding to the organ characterizing the face of each person, such as the eye, nose, and mouth, are extracted as feature points. Then, as a result of the face landmarks of each of the plurality of persons being extracted from each captured image, a large number of erroneous spatial correspondence points based on erroneous combinations of face landmarks occurs. FIG. 22 is a diagram explaining the way a tremendously large number of "spatial correspondence points of right eye" including erroneous three-dimensional positions at which the right eye does not exist actually occurs. Then, the same thing occurs for other facial organs, such as the nose and mouth, and as a result, a large amount of erroneous surface three-dimensional information representing a face of the size that does not cause a sense of incongruity based on a large number of erroneous combinations of face landmarks is obtained. Consequently, in the present embodiment, a method for appropriately obtaining surface three-dimensional information corresponding to each face in a case where two or more persons are captured in a multi-viewpoint image is explained. In the following, points different from those of the first embodiment are explained mainly.
<Function Configuration of Image Processing Apparatus>
FIG. 23 is a diagram showing a function configuration (software configuration) example of the image processing apparatus 102 according to the present embodiment and FIG. 24 is a flowchart showing a flow of processing by each function unit. A large difference from the first embodiment lies in that a surface three-dimensional information integration unit 2301 is added in FIG. 13 and surface three-dimensional information integration processing (S2401) is added in FIG. 24. However, the difference from the first embodiment is not only this and the contents of the surface three-dimensional information derivation processing (S403) and the surface three-dimensional information selection processing (S404) are also different. In the following, each piece of processing of derivation, selection, and integration of surface three-dimensional information in the present embodiment is explained in detail.
<Surface Three-Dimensional Information Derivation Processing>
FIG. 25 is a flowchart showing details of the surface three-dimensional information derivation processing (S403) according to the present embodiment. In the following, explanation is given along the flow in FIG. 25.

Figure 26:
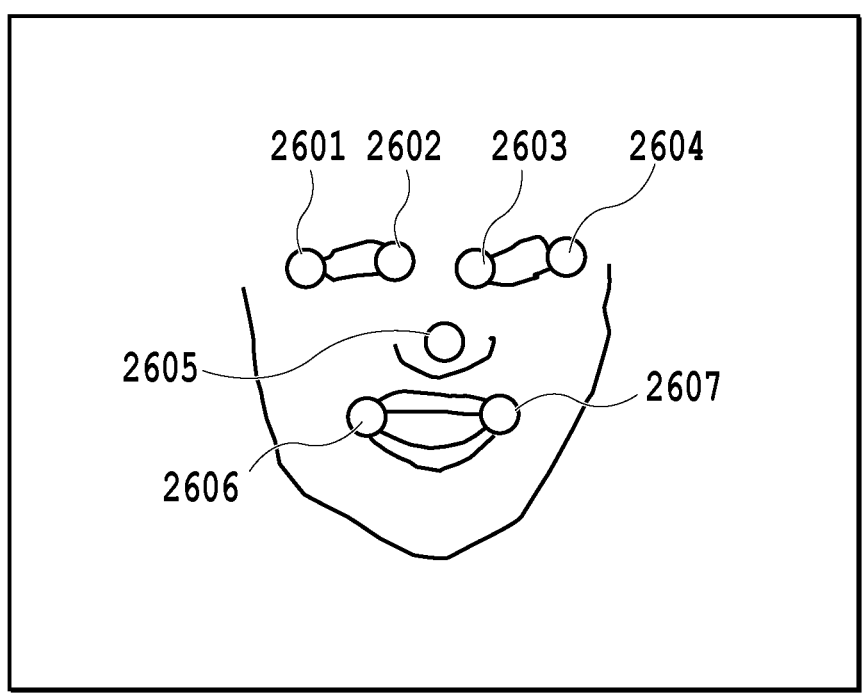
FIG. 26 is a diagram showing one example of face landmarks.

At S2501, from each captured image, two or more feature points are extracted per object of the same type. In the present embodiment, face landmarks of each of a plurality of persons captured in each captured image are detected and extracted as feature points. For the detection of face landmarks, it may be possible to use a publicly known face recognition technique, for example, such as Dlib and OpenCV. Here, it is assumed that a total of seven face landmarks, that is, an outer corner of right eye 2601, an inner corner of right eye 2602, an outer corner of left eye 2603, an inner corner of left eye 2604, a tip of nose 2605, a right corner of mouth 2606, and a left corner of mouth 2607 are detected and extracted as feature points as shown in FIG. 26. The number of extraction-target face landmarks is not limited to seven as described above. For example, it may also be possible not to include one of the above-described seven face landmarks or include more facial regions, such as a point between eyebrows, a point on cheek, and a point on a line of jaw.

Figure 27:
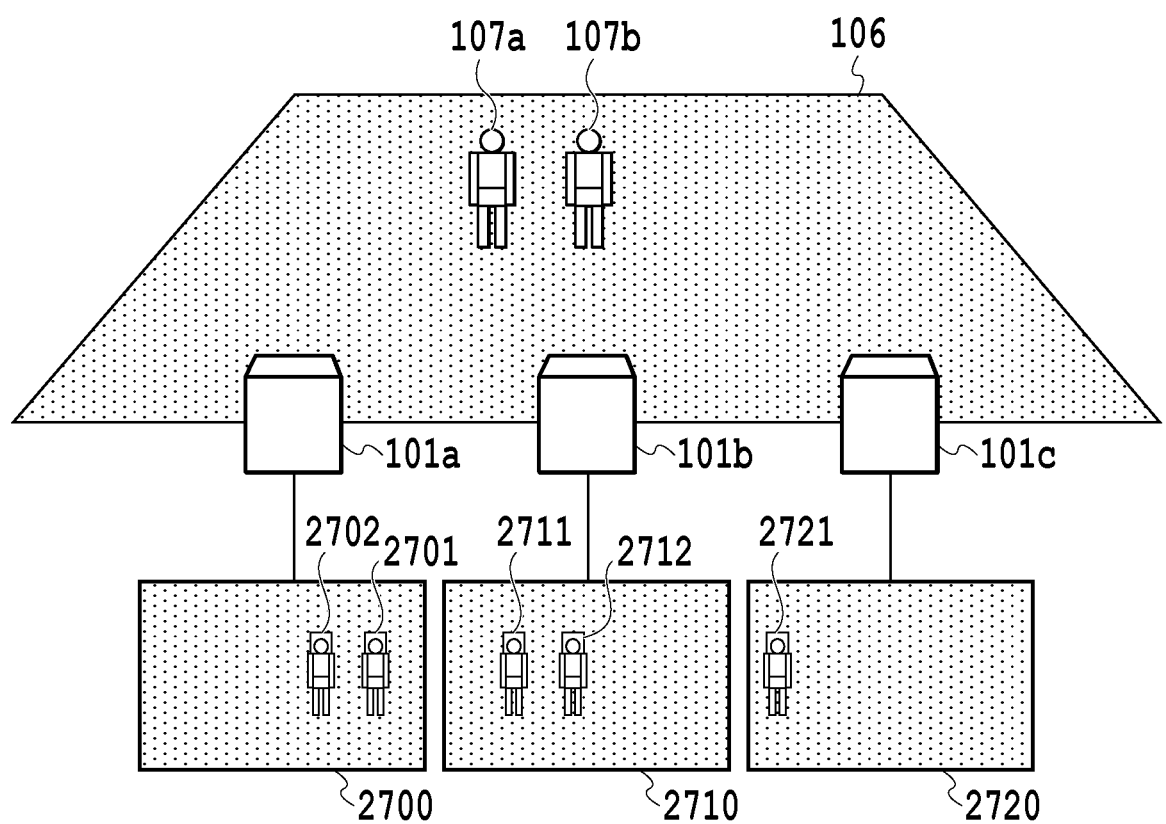
FIG. 27 is a diagram showing an example of detection of a face in a captured image.

At S2502, for two or more feature points per object of the same type extracted from each captured image, processing to associate the feature points between two captured images whose viewpoints are different is performed. Due to this, a combination of feature point groups in a correspondence relationship between the captured images is determined, which corresponds to the above-described one object. The "combination of feature point groups" determined here corresponds to "feature point pair" in the first embodiment. However, in a case where a plurality of objects of the same type is captured in each captured image, there is a possibility that "combination of feature point groups" that is determined is not that of the same object captured in the two captured images. Here, explanation is given by using a specific example. FIG. 27 shows images 2700, 2710, and 2720 obtained by the three cameras 101a to 101c, respectively, by capturing two persons 107a and 107b. Here, the person 107a is captured in the captured images 2700 and 2710 and the person 107b is captured in all the three captured images 2700, 2710, and 2720. Then, for the face portion of each of the persons 107a and 107b, which is detected by extracting the seven face landmarks from each captured image, face fames 2701, 2702, 2711, 2712, and 2721 in the shape of a circumscribed rectangle are shown. The combinations (of faces (~ seven face landmarks)) that can be considered in this example are the following eight combinations.

F1 (face frame 2701 and face frame 2711): erroneous correspondence

F2 (face frame 2701 and face frame 2712): correct correspondence

F3 (face frame 2701 and face frame 2721): correct correspondence

F4 (face frame 2702 and face frame 2711): correct correspondence

F5 (face frame 2702 and face frame 2712): erroneous correspondence

F6 (face frame 2702 and face frame 2721): erroneous correspondence

F7 (face frame 2711 and face frame 2721): erroneous correspondence

F8 (face frame 2712 and face frame 2721): correct correspondence

As described above, the eight combinations of feature point groups that can be considered are obtained, but erroneous combinations of faces (erroneous correspondence) are also included therein. Consequently, "combination of feature point groups" that is determined in the present embodiment is called "feature point pair candidate" in the following. Further, "combination of faces" using face landmarks as a feature point group is called "face candidate".

At S2503, for each feature point pair candidate determined at S2502, the spatial correspondence points of the feature point group are derived. In a case of the present embodiment, one face candidate includes seven face landmarks. Consequently, based on the camera parameters of the cameras corresponding to the two captured images relating to the face candidate of interest, for each face landmark, the intersection of the two corresponding rays is determined as a spatial correspondence point. In this manner, seven spatial correspondence points corresponding to each individual face candidate are derived as surface three-dimensional information.

The above is the contents of the surface three-dimensional information derivation processing according to the present embodiment.

<Surface Three-Dimensional Information Selection Processing>

Figure 28:
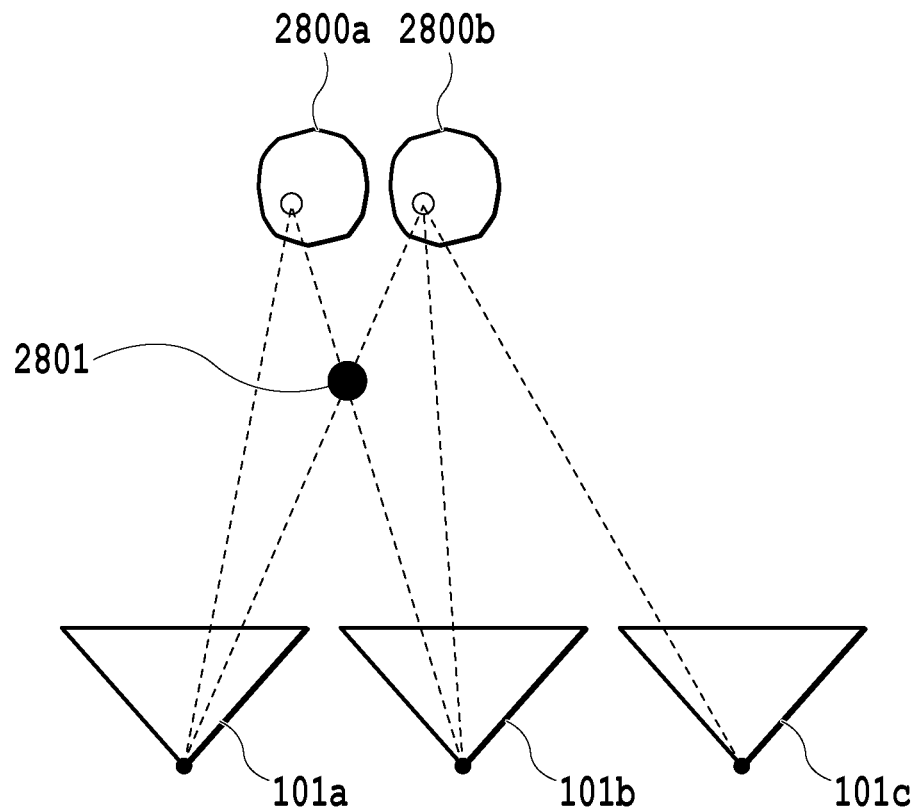
FIG. 28 is a diagram showing a specific example in which a spatial correspondence point of a face landmark occurs at a position at which the face of a person does not exist.

In the determination processing of the feature point pair candidate (in the present embodiment, face candidate) in the above-described surface three-dimensional information derivation processing, collation of which person captured in the captured image the feature point pair candidate corresponds to is not performed. Because of this, as described previously, the face candidate of the combination of the faces of different persons, which is erroneous correspondence, is also included. As a result of that, in the spatial correspondence points of the face landmarks for each face candidate, which are derived as surface three-dimensional information, a spatial correspondence point indicating the three-dimensional position at which the human face does not exist actually is also included. FIG. 28 shows a specific example thereof. FIG. 28 is a diagram in a case where the image capturing space in FIG. 27 is viewed from directly above, and a head 2800*a* of the person 107*a* and a head 2800*b* of the person 107*b* are shown. In FIG. 27, the face detected for the person 107*a* is indicated by the face frame 2702 in the captured image 2700 and indicated as the face frame 2711 in the captured image 2710. Further, the face detected for the person 107*b* is indicated by the face frame 2701 in the captured image 2700 and indicated as the face frame 2712 in the captured image 2710. A point 2801 in FIG. 28 represents the spatial correspondence point of the outer corner of right eye 2601 derived from the face candidate F1 (face frame 2701 and face frame 2711), which is the combination of the faces of different persons, and therefore, it can be seen that the point 2801 indicates the three-dimensional position of the outer corner of right eye that does not exist actually. As described above, the spatial correspondence point of the face landmark derived from the face candidate whose correspondence between persons is erroneous has a strong possibility of indicating the position at which the person does not exist actually. Consequently, the spatial correspondence points are selected from among the derived spatial correspondence points of the face landmarks so that only the spatial correspondence points whose position is close to the approximate shape surface obtained from the approximate shape data remain.

Figure 29:
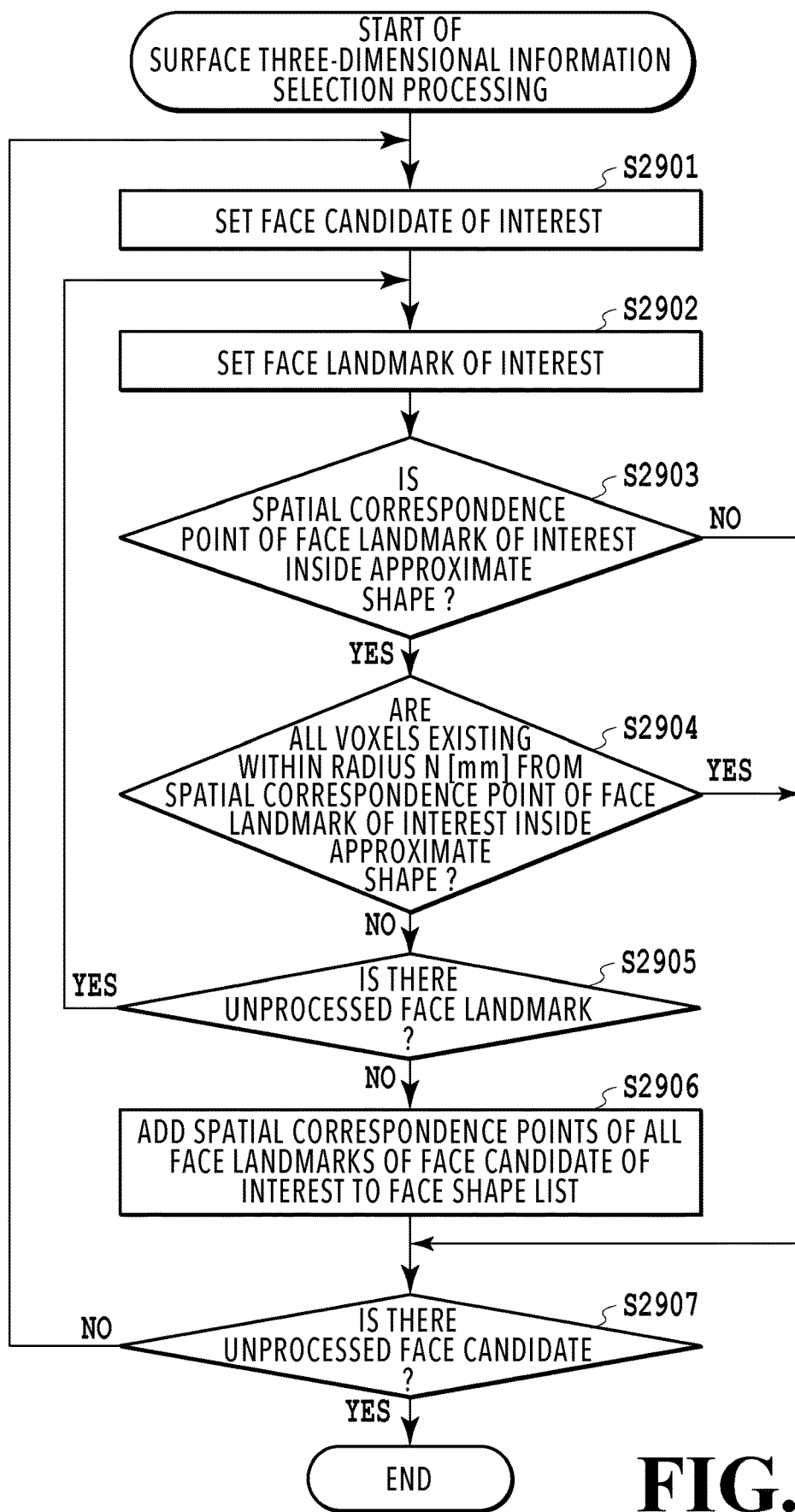
FIG. 29 is a flowchart showing details of processing to select surface three-dimensional information according to the second embodiment.

FIG. 29 is a flowchart showing details of the surface three-dimensional information selection processing (S404) according to the present embodiment. Since the Visual Hull method cannot represent concavity, regions different from the actual shape are included in the estimated voxel set. On the other hand, if there is no error in the silhouette image used, it is guaranteed that there is no true shape outside the estimated shape. Because of this, the possibility is strong that the spatial correspondence point indicating the three-dimensional position outside the approximate shape obtained by the visual hull method is erroneous. Consequently, in the present embodiment, processing is performed so that among the derived spatial correspondence points of the face landmarks, only those indicating the three-dimensional position inside the voxel set representing the approximate shape remain. In the following, explanation is given along the flow in FIG. 29.

At S2901, the face candidate of interest is set as the processing target from among all the face candidates. At S2902 that follows, one face landmark of interest is set as the processing target from the face landmarks as the feature points. In a case of the present embodiment, from the seven face landmarks, the face landmark of interest is set sequentially one by one.

At S2903, the processing that is performed next is distributed in accordance with whether or not the spatial correspondence point of the face landmark of interest set at S2902 is included inside the approximate shape. That is, in a case where the spatial correspondence point of the face landmark of interest is included inside the voxel set representing the approximate shape, the processing at S2904 is performed next and in a case where the spatial correspondence point is not included inside the voxel set, the processing at S2907 is performed next.

Figure 30A:
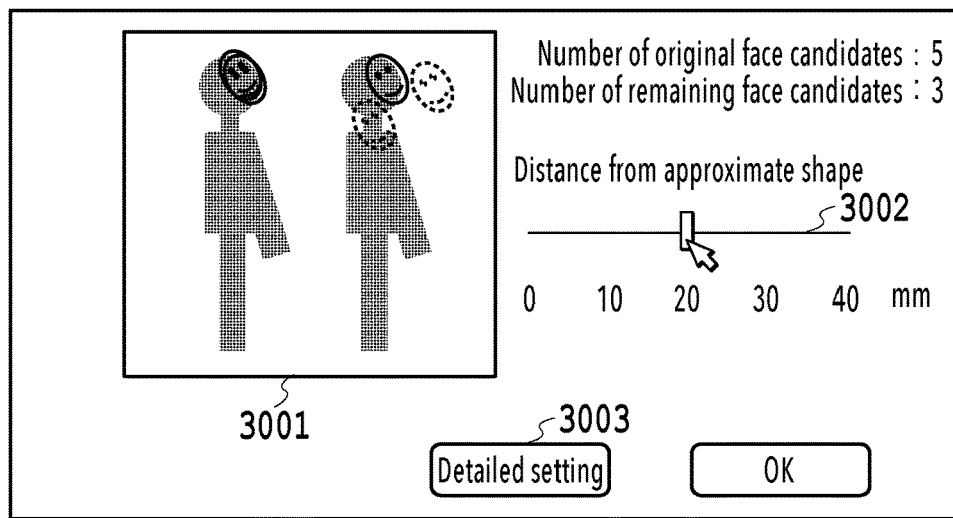
FIG. 30A to FIG. 30C are each a diagram showing one example of a UI screen for setting control parameters.

At S2904, the processing that is performed next is distributed in accordance with whether or not all the voxels existing within a radius N (mm) with the spatial correspondence point of the face landmark of interest being taken to be a center are included inside the approximate shape. Here, N is a control parameter and it is ideal to use the maximum value of the difference between "approximate shape surface obtained based on visual hull method" and "true position of face landmark" as N and N is determined by further taking into consideration the number of viewpoints and the like. FIG. 30A is a diagram showing one example of a user interface screen (UI screen) for a user to set the control parameter N. In an image display area 3001 on the UI screen shown in FIG. 30A, approximate shapes or two persons are represented by gray silhouettes and the derived face candidate is indicated by a broken line. It is made possible for a user to designate an arbitrary value as the control parameter N representing the distance from the approximate shape in a range from 0 to 40 [mm] by operating a seek bar 3002 within the UI screen and here, N=20 [mm] is designated. In a case where all the voxels existing within the circle with the radius N mm with the spatial correspondence point of the face landmark of interest being taken to be a center are not included inside the approximate shape (that is, the spatial correspondence point exists within N mm from the approximate shape surface), the processing at S2905 is performed next. On the other hand, in a case where all the voxels existing within the circle with the radius N (mm) with the spatial correspondence point of the face landmark of interest being taken to be a center are included inside the approximate shape (that is, the spatial correspondence point does not exist within N mm from the approximate shape surface), the processing at S2907 is performed next.

At S2905, the processing that is performed next is distributed in accordance with whether or not the processing of all the face landmarks included in the face candidate of interest is completed. In a case where all the face landmarks are processed, the processing at S2906 is performed next. On the other hand, in a case where there is an unprocessed face landmark, the processing returns to S2902, and the next face landmark of interest is set and the processing is continued.

At S2906, the spatial correspondence points of all the face landmarks included in the face candidate of interest are added to the list. In the list thus obtained, a spatial correspondence point group for each face candidate is described, which is estimated to be correct as those representing the surface shape of the face of a person existing in the image capturing space.

Figure 31A:
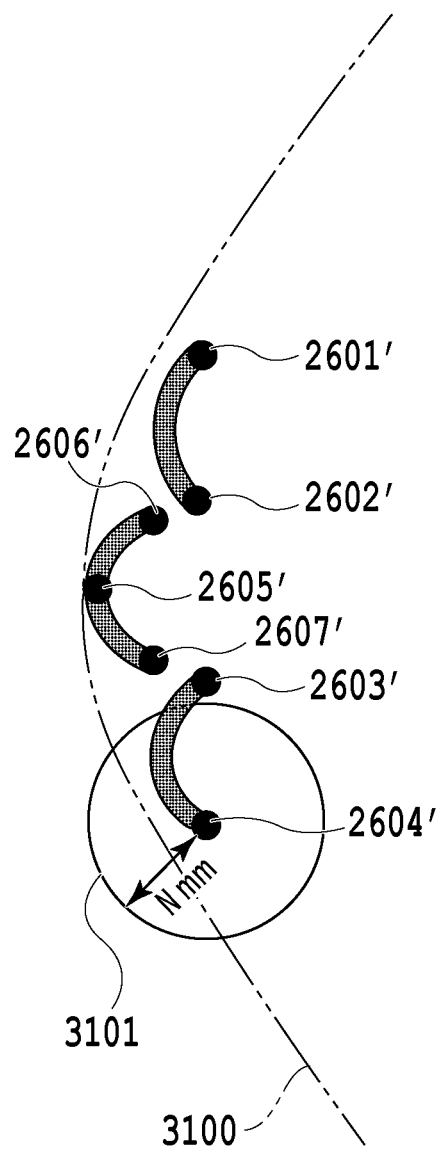
FIG. 31A and FIG. 31B are each a diagram showing a specific example of selection of face landmarks.
Figure 31B:
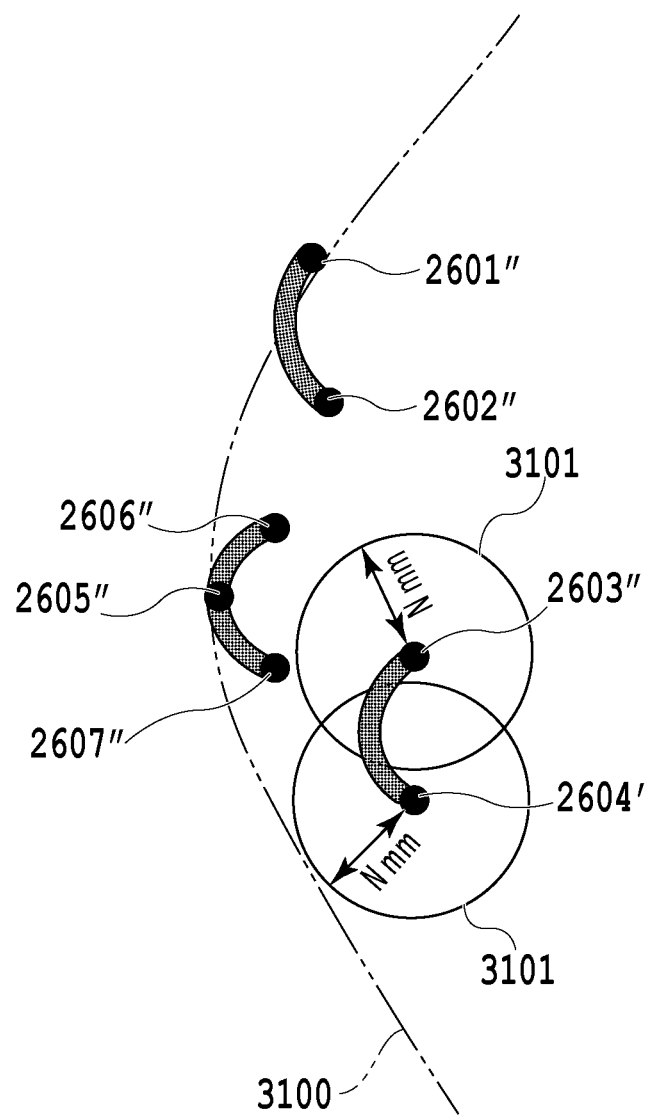

At S2907, the processing that is performed next is distributed in accordance with whether or not the processing of all the face candidates is completed. In a case where there is an unprocessed face candidate, the processing is returned to S2901, and the next face candidate of interest is set and the processing is continued. On the other hand, in a case where the processing of all the face candidates is completed, this processing is terminated. By the processing such as this, it is possible to select only the face candidates inside the approximate shape and for which it is determined that the spatial correspondence point of the face landmark exists within a predetermined distance from the approximate shape surface. FIG. 31A and FIG. 31B each show a specific example of the selection by the above-described flow. In FIG. 31A and FIG. 31B, a two-dot chain line curve 3100 indicates the approximate shape surface of the face of a person and a solid line circle 3101 indicates the circle with the radius N mm with the spatial correspondence point of the face landmark being taken to be a center. FIG. 31A is one example of the surface three-dimensional information that remains by the selection, that is, the spatial correspondence point group for each face candidate, which is described in the list described previously. In this example, it can be seen that spatial correspondence points 2601' to 2607' of all the face landmarks of the face candidate exist inside the approximate shape surface 3100 and exist within N mm from the approximate shape surface 3100. FIG. 31B is one example of the surface three-dimensional information that does not remain by the selection, that is, the spatial correspondence point group for each face candidate, which is not described in the list described previously. In this example, it can be seen that among spatial correspondence points 2601" to 2607" of all the face landmarks of the face candidate, the spatial correspondence point 2601" of the outer corner of right eye is located outside the approximate shape surface 3100 and the two spatial correspondence points 2603" and 2604" of the inner corner of left eye and the outer corner of left eye do not exist within N mm (for example, N=30 mm) from the approximate shape surface 3100.

The above is the contents of the surface three-dimensional information selection processing according to the present embodiment. Due to this, the erroneous spatial correspondence point of the face landmark derived from the face candidate, which is erroneous correspondence of persons, is excluded and surface three-dimensional information with high accuracy corresponding to the face of a person who exists actually is obtained. In the image display area 3001 on the UI screen in FIG. 30A, the face candidates that remain by the selection are indicated by a solid line and at the same time, on the right side of the screen, the selection results (number of face candidates before and after selection) are shown. In the flow in FIG. 29, only the face landmarks whose spatial correspondence point exists inside the approximate shape are allowed to remain, but it may also be possible to allow the face landmark whose spatial correspondence point exists outside the approximate shape to remain by taking into consideration the error that the silhouette image may include. In this case, for example, a threshold value for determining which distance from the approximate shape surface to the outside is allowed is set separately. It is preferable to set the threshold value for determining whether or not the spatial correspondence point is included inside the approximate shape (in the following, "threshold value for outside") at this time to a value smaller than the threshold value specified by the control parameter N (in the following, "threshold value for inside"), for example, such as 5 [mm]. Further, it may also be possible to enable a user to designate the threshold value for outside on the UI screen shown in FIG. 30A described previously as in the case of the control parameter N specifying the threshold value for inside. Further, the detection accuracy of the face landmark is different depending on the region and for example, it is easy to detect the outer corner of eye and the corner of mouth with high accuracy because the image feature is conspicuous, but on the other hand, it is difficult to accurately detect, for example, the position of the tip of nose. Consequently, for example, it may also be possible to perform the above-described selection by taking the spatial correspondence points of only the six face landmarks, that is, both inner corners of eye, both outer corners of eye, and both corners of mouth, excluding the tip of nose, among the above-described seven face landmarks.

<Surface Three-Dimensional Information Integration Processing>

Figure 32:
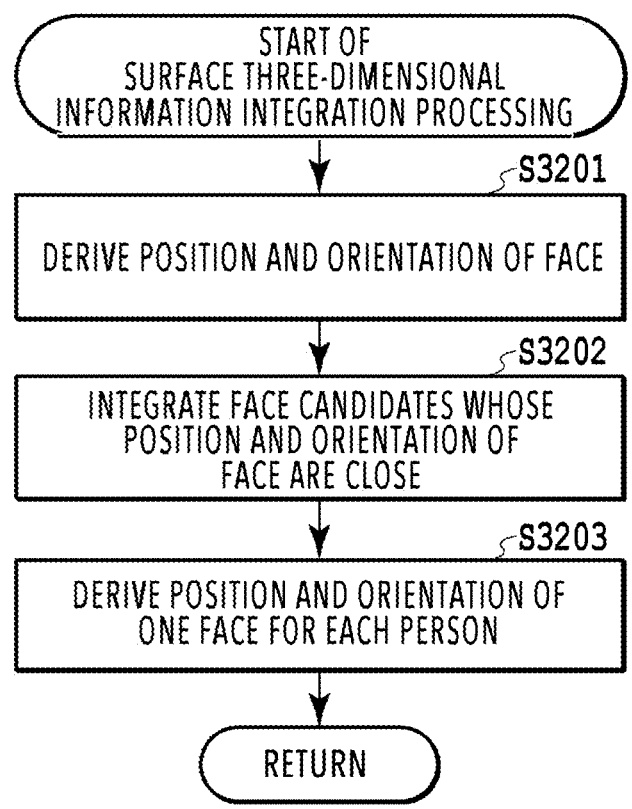
FIG. 32 is a flowchart showing details of processing to integrate surface three-dimensional information according to the second embodiment.

FIG. 32 is a flowchart showing details of the surface three-dimensional information integration processing (S2401) according to the present embodiment, which is performed by the surface three-dimensional information integration unit 2301. By this processing, the selected feature point pair candidates are integrated so that one candidate exists for one object (here, one face candidate exists for one person). In the following, explanation is given along the flow in FIG. 32.

At S3201, for each face candidate that remains by the selection, the position and orientation of the face in the image capturing space are derived. First, the average value of the three-dimensional coordinates of the spatial correspondence points for each of the plurality of (in the present embodiment, seven) face landmarks configuring the face candidate is calculated. Then, the three-dimensional position of each face candidate, which is specified by the average value of the three-dimensional coordinates calculated for all the face landmarks, is determined to be the position of the face in the image capturing space. At this time, for example, it may also be possible to exclude the face landmark whose accuracy is low (for example, tip of nose) among the seven face landmarks from the average value calculation target. Next, the normal of a triangle including both the corners of eyes and the middle point between both the corners of mouth is found and the direction in which the face faces forward is specified and further, the direction vector from the outer corner of left eye toward the outer corner of right eye is found and the rightward direction of the face is specified and the orientation of the face is determined. Due to this, the position and orientation of the face are derived for each face candidate.

Figure 30B:
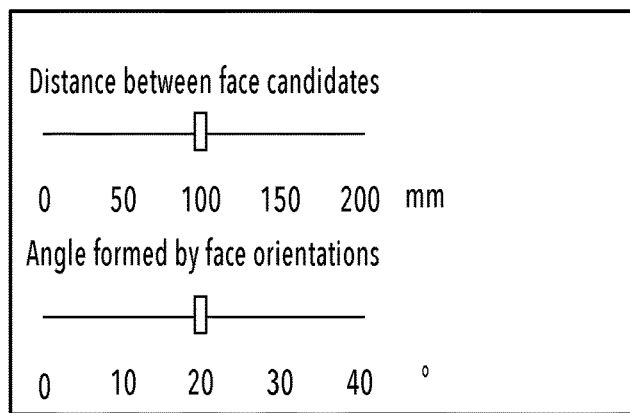
Figure 30C:
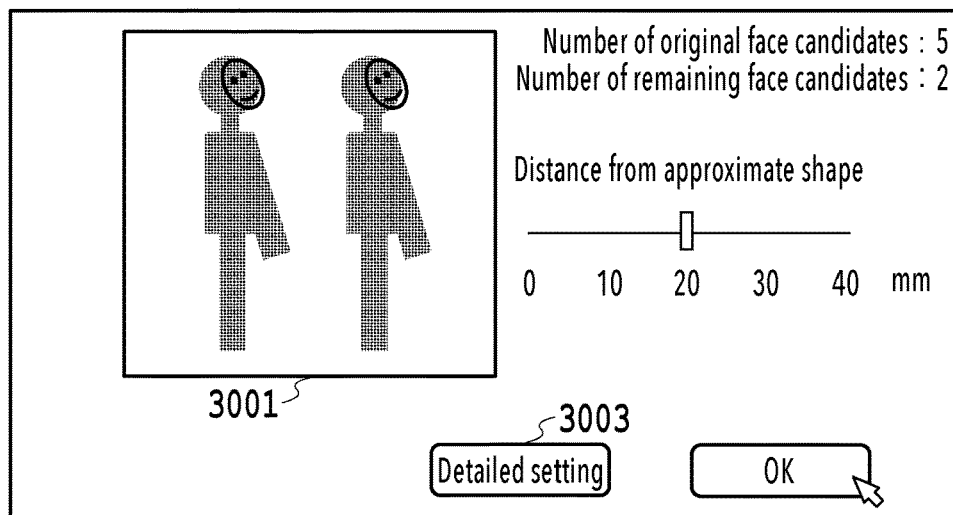

At S3202, based on "position and orientation of face" derived for each face candidate, the face candidates whose "position and orientation of face" are close are integrated. Here, as the reference of "close", first, for the position of the face, the condition is that the distance between the faces is M [mm] or less. Then, for the orientation of the face, the condition is that both an angle θf formed by forward directions and an angle θr formed by rightward directions are less than or equal to θt. Here, M and θt are each a control parameter and set by a user, for example, via the UI screen shown in FIG. 30B. The UI screen in FIG. 30B is displayed by pressing down a "Detailed setting" button 3003 within the UI screen in FIG. 3A described previously. Here, the transverse width of the face of an ordinary person is about 160 [mm] and a case where the distance between two faces is 100 [mm] or less under the restrictions that, for example, the difference between the face orientations is 30° or less is deemed to be abnormal. Consequently, on the UI screen in FIG. 30B, the maximum value of the distance M between face candidates is set to 200 [mm] and the maximum value of the angle θf formed by face orientations is set to 40[ ]. However, it may be possible to perform the setting in accordance with the situation, such as that M is set to a smaller value in a case where the image capturing target is a child whose face is small and that θt is set to a larger value in a case where the estimation accuracy of face orientation is low. Via the UI screen such as this, the control parameters M and θt are set. Then, in a case where two or more "positions and orientations of faces" that satisfy the conditions specified by the above-described control parameters M and θt are specified, they are determined to represent "position and orientation of face" of the same person and integrated. Specifically, for each face landmark of two or more face candidates determined to be the integration target, the median of the three-dimensional coordinates of the spatial correspondence point is calculated. Then, the three-dimensional coordinates indicated by the calculated median are taken to be the three-dimensional coordinates of the spatial correspondence point of each face landmark in the integrated face candidate. The above-described method in which the median is employed in a case where a plurality of three-dimensional coordinates is integrated is one example and it may also be possible to employ the average value, the mode, and the intermediate value of the maximum value and the minimum value. Further, it may also be possible to employ the three-dimensional coordinates closest to the approximate shape surface or the three-dimensional coordinates farthest from the approximate shape surface. In this manner, the surface three-dimensional information (here, spatial correspondence points of seven face landmarks) deemed to represent the face of the same person is integrated and the surface three-dimensional information corresponding in one-to-one manner to each face of the person existing in the image capturing space is obtained. FIG. 30C shows the image display area 3001 on the UI screen after the integration processing and it can be seen that the two selected face candidates of the person on the left side are integrated into one. Further, the integration results are reflected also on "Number of remaining face candidates" on the right side on the screen and the number of face candidates has changed from "3" to "2".

At S3203, based on the three-dimensional coordinates of the spatial correspondence point of each face landmark in each integrated face candidate, for the persons existing in the image capturing space, the position and orientation of one face are derived for each person. For the derivation here, it may be possible to use the same method as that used at S3101 described above.

The above is the contents of the surface three-dimensional information integration processing. In this manner, it is possible to obtain surface three-dimensional information on the face corresponding in one-to-one manner to the person captured in each captured image of the multi-viewpoint image. In the present embodiment, explanation is given by taking the face of a person as an example, but the present embodiment is not limited to this and for example, it may also be possible to apply the present embodiment to parts (for example, arm and leg) other than the face, and further, it may also be possible to apply the present embodiment to an object other than a person, for example, to the tire of an automobile or motorcycle.

Modification Example

Figure 33A:
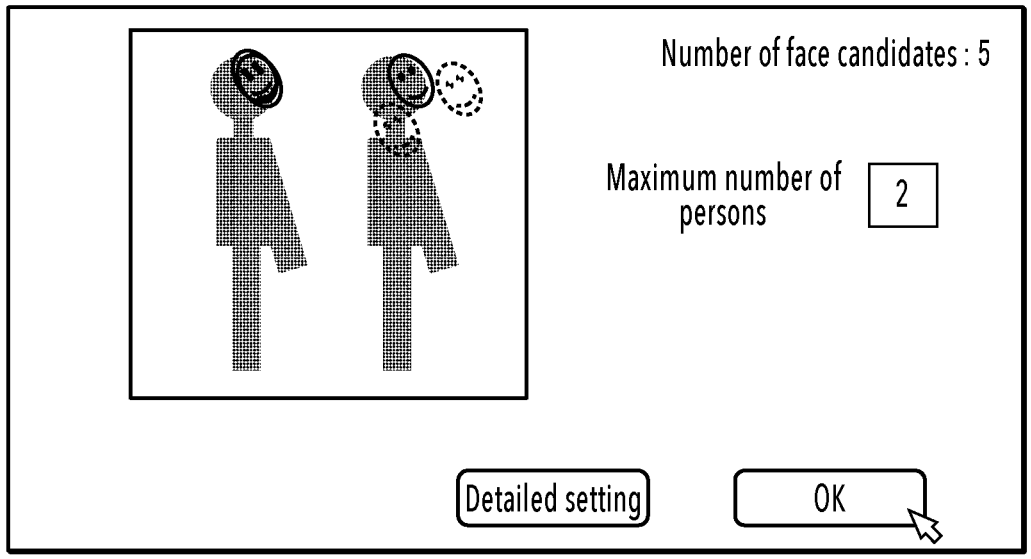
FIG. 33A and FIG. 33B are each a diagram showing one example of a UI screen for setting control parameters.
Figure 33B:
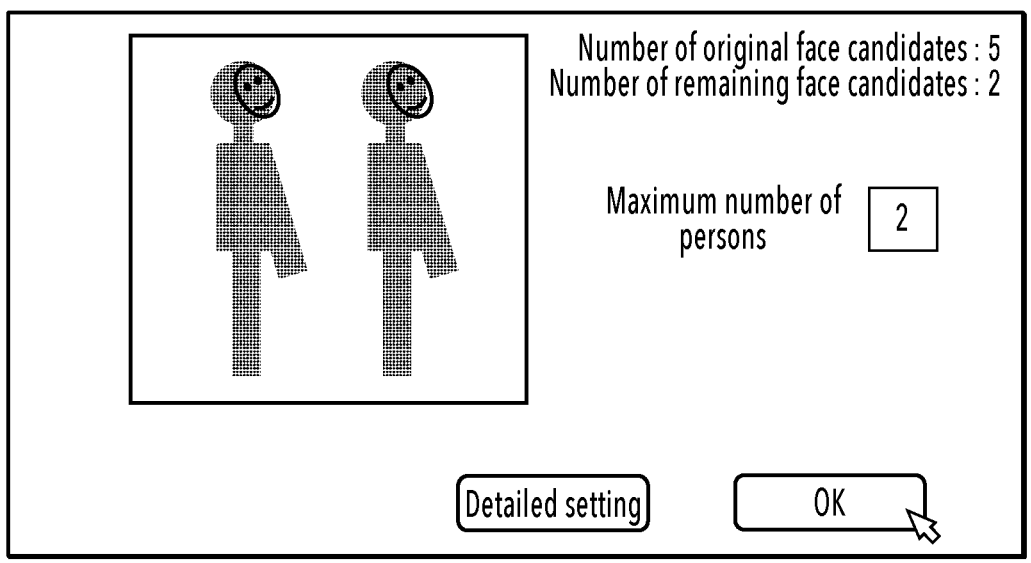

In the above-described embodiment, the example is explained in which the control parameters M and θt in the surface three-dimensional information integration processing are set based on the user operation, but the setting method of control parameters is not limited to this. For example, it may also be possible to cause a user to designate the number of persons existing in the target scene via a UI screen as shown in FIG. 33A and FIG. 33B and automatically determine the control parameters M and 6t so that the number of faces after integration is less than or equal to the designated number of persons. In this case, for example, it is possible to determine the control parameter M by reducing 40 [mm] by 1 [mm] each time and employing the value in a case where the number of face candidates after integration reaches two, and so on. It may also be possible to set the control parameter by the method such as this.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to obtain three-dimensional shape data with high accuracy from three-dimensional shape data representing an approximate shape of an object.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-129247, filed Aug. 15, 2022, which is hereby incorporated by reference herein in its entirety.

What is claimed is:

1. An image processing apparatus comprising:
one or more memories storing instructions; and
one or more processors executing the instructions to:
(1) obtain three-dimensional shape data of an object existing in an image capturing space;
(2) obtain a plurality of distance images each representing a distance to the object and corresponding to a plurality of viewpoints; and
(3) correct the three-dimensional shape data by (a) evaluating the three-dimensional shape data based on the plurality of distance images and (b) based on results of the evaluation, deleting a unit element estimated not to represent a shape of the object among unit elements configuring the three-dimensional shape data,
wherein in the correcting: (a) a unit element of interest is determined sequentially from the unit elements configuring the three-dimensional shape data; (b) an evaluation value is added to the unit element of interest in a case where a distance from a viewpoint corresponding to the distance image to the unit element of the interest is smaller than a distance at a pixel position on the distance image, which corresponds to the unit element of interest; and (c) the unit element of interest is deleted in a case where an accumulated value of the evaluation value exceeds a threshold value.

2. The image processing apparatus according to claim 1, wherein the three-dimensional shape data is data using a voxel as the unit element,
wherein the one or more processors execute the instructions to: set the threshold value to each local space obtained by dividing the image capturing space, and
wherein in the correcting: whether the accumulated value of the evaluation value exceeds the threshold value is determined by using a threshold value among threshold values set for each of the local spaces, which corresponds to a position in the image capturing space of a voxel set represented by the three-dimensional shape data.

3. The image processing apparatus according to claim 2, wherein in the setting:
the image capturing space is divided in accordance with a division condition; and
the threshold value is set, in accordance with a threshold value pattern, to each local space obtained by the division.

4. The image processing apparatus according to claim 3, wherein the division condition and the threshold value pattern are designated via a user interface receiving user instructions.

5. The image processing apparatus according to claim 3, wherein in the division condition, a number of divisions, an interval of division, and a shape of local space are included.

6. The image processing apparatus according to claim 3, wherein in the threshold value pattern, the closer the position of a local space is to the center of the image capturing space, the larger a threshold value is arranged.

7. The image processing apparatus according to claim 2, wherein in the setting:
the plurality of distance images is divided into groups; and
the threshold value is set to each of the local spaces based on visibility to each local space of the distance image belonging to each group.

8. The image processing apparatus according to claim 7, wherein in the setting:
a number of distance images with visibility to a local space of interest among all the local spaces is counted for each group;
a temporary threshold value for a local space of interest is determined for each group based on the number of distance images with visibility, which is found for each group; and
a minimum value of the temporary threshold values determined for each group is set as a threshold value for the local space of interest.

9. The image processing apparatus according to claim 7, wherein in the setting: (1) a number of distance images with visibility to a local space of interest among all the local spaces is counted for each group; and (2) a threshold value for a local space of interest is set for each group based on the number of distance images with visibility, which is found for each group, and
wherein in the correcting: (1) the three-dimensional shape data is divided in accordance with the groups; and (2) whether an accumulated value of the evaluation value exceeds the threshold value is determined for each piece of the divided three-dimensional shape data by using the threshold value set for each of the groups.

10. The image processing apparatus according to claim 7, wherein in the setting: the plurality of distance images is divided into groups based on camera parameters of an imaging device corresponding to the distance image so that the distance images corresponding to the cameras having a common image capturing direction belong to the same group, or the distance images whose position and orientation indicated by the camera parameters are similar belong to the same group.

11. The image processing apparatus according to claim 2, wherein in the setting: the larger the number of distance images within whose viewing angle a local space is included among the plurality of distance images, the larger a threshold value is set to the local space.

12. The image processing apparatus according to claim 2, wherein in the setting: a plurality of threshold values in accordance with image capturing directions is set for each local space obtained by dividing the image capturing space, and
wherein in the correcting: (1) the voxel set is divided in accordance with the image capturing directions; and (2)

whether an accumulated value of the evaluation value exceeds a threshold value is determined for each of the divided voxel sets by using the threshold value corresponding to the divided image capturing direction among the plurality of threshold values set for the local space corresponding to the position in the image capturing space.

13. The image processing apparatus according to claim 2, wherein in the obtaining three-dimensional shape data: a plurality of pieces of three-dimensional shape data corresponding to each of a plurality of objects is obtained in a case where the plurality of objects exists in the image capturing space, and wherein in the correcting: whether an accumulated value of the evaluation value exceeds a threshold value is determined by using each threshold value corresponding to each position in the image capturing space of the voxel set represented by each of the plurality of pieces of three-dimensional shape data among the threshold values set for each of the local spaces.

14. The image processing apparatus according to claim 1, wherein in the correcting: a contribution rate to results of the evaluation is controlled by weighting the plurality of distance images or the unit elements configuring the three-dimensional shape data.

15. The image processing apparatus according to claim 1, wherein the one or more processors execute the instructions to: obtain a plurality of captured images in which the object is captured, which is obtained by a plurality of imaging devices corresponding to the plurality of viewpoints, and wherein in the obtaining three-dimensional shape data: the three-dimensional shape data is obtained by generating the three-dimensional shape data based on the plurality of captured images.

16. The image processing apparatus according to claim 15, wherein in the obtaining three-dimensional shape data: the three-dimensional shape data is generated by the visual hull method using the plurality of captured images.

17. The image processing apparatus according to claim 1, wherein the one or more processors execute the instructions to: obtain a plurality of captured images in which the object is captured, which is obtained by a plurality of imaging devices corresponding to the plurality of viewpoints, and wherein in the obtaining a plurality of distance images: the plurality of distance images is obtained by generating the plurality of distance images based on the plurality of captured images.

18. The image processing apparatus according to claim 17, wherein in the obtaining a plurality of distance images: the plurality of distance images is generated by stereo matching using the plurality of captured images.

19. The image processing apparatus according to claim 1, wherein the one or more processors execute the instructions to: (1) derive surface three-dimensional information on the object based on the plurality of captured images and the three-dimensional shape data; and (2) select the derived surface three-dimensional information based on a distance from a shape surface of the object represented by the three-dimensional shape data, wherein in the obtaining a plurality of distance images, the plurality of distance images is modified based on the selected surface three-dimensional information, and wherein in the correcting, the evaluation is performed by using the plurality of modified distance images.

20. The image processing apparatus according to claim 19, wherein the modification is processing to cause the depth value of a pixel on a distance image, which corresponds to each feature point extracted from the plurality of captured images, to become closer to the depth value calculated based on the selected surface three-dimensional information.

21. An image processing method comprising the steps of:
obtaining three-dimensional shape data of an object existing in an image capturing space;
obtaining a plurality of distance images each representing a distance to the object and corresponding to a plurality of viewpoints; and
correcting the three-dimensional shape data by (a) evaluating the three-dimensional shape data based on the plurality of distance images and (b) based on results of the evaluation, deleting a unit element estimated not to represent a shape of the object among unit elements configuring the three-dimensional shape data,
wherein in the correcting: (a) a unit element of interest is determined sequentially from the unit elements configuring the three-dimensional shape data; (b) an evaluation value is added to the unit element of interest in a case where a distance from a viewpoint corresponding to the distance image to the unit element of the interest is smaller than a distance at a pixel position on the distance image, which corresponds to the unit element of interest; and (c) the unit element of interest is deleted in a case where an accumulated value of the evaluation value exceeds a threshold value.

22. A non-transitory computer-readable storage medium storing a program for causing a computer to perform an image processing method, the image processing method comprising the steps of:
obtaining three-dimensional shape data of an object existing in an image capturing space;
obtaining a plurality of distance images each representing a distance to the object and corresponding to a plurality of viewpoints; and
correcting the three-dimensional shape data by (a) evaluating the three-dimensional shape data based on the plurality of distance images and (b) based on results of the evaluation, deleting a unit element estimated not to represent a shape of the object among unit elements configuring the three-dimensional shape data,
wherein in the correcting: (a) a unit element of interest is determined sequentially from the unit elements configuring the three-dimensional shape data; (b) an evaluation value is added to the unit element of interest in a case where a distance from a viewpoint corresponding to the distance image to the unit element of the interest is smaller than a distance at a pixel position on the distance image, which corresponds to the unit element of interest; and (c) the unit element of interest is deleted in a case where an accumulated value of the evaluation value exceeds a threshold value.

23. An image processing apparatus comprising:
one or more memories storing instructions; and
one or more processors executing the instructions to:
(1) obtain three-dimensional shape data of an object existing in an image capturing space;
(2) obtain a plurality of distance images each representing a distance to the object and corresponding to a plurality of viewpoints; and
(3) correct the three-dimensional shape data by (a) evaluating the three-dimensional shape data based on the plurality of distance images and (b) based on results of the evaluation, deleting a unit element estimated not to represent a shape of the object among unit elements configuring the three-dimensional shape data, wherein the one or more processors execute the instructions to: (a) derive surface three-dimensional information on the object based on the plurality of captured images and the three-dimensional shape data; and (b) select the derived surface three-dimensional information based on a distance from a shape surface of the object represented by the three-dimensional shape data, wherein in the obtaining a plurality of distance images, the plurality of distance images is modified based on the selected surface three-dimensional information, and wherein in the correcting, the evaluation is performed by using the plurality of modified distance images.

24. An image processing method comprising:

obtaining three-dimensional shape data of an object existing in an image capturing space;

obtaining a plurality of distance images each representing a distance to the object and corresponding to a plurality of viewpoints; and correcting the three-dimensional shape data by (a) evaluating the three-dimensional shape data based on the plurality of distance images and (b) based on results of the evaluation, deleting a unit element estimated not to represent a shape of the object among unit elements configuring the three-dimensional shape data, wherein in the method, (a) surface three-dimensional information on the object is derived based on the plurality of captured images and the three-dimensional shape data, and (b) the derived surface three-dimensional information is selected based on a distance from a shape surface of the object represented by the three-dimensional shape data, wherein in the obtaining a plurality of distance images, the plurality of distance images is modified based on the selected surface three-dimensional information, and wherein in the correcting, the evaluation is performed by using the plurality of modified distance images.

* * * * *